US012681336B2

(12) United States Patent
Hanßen et al.

(10) Patent No.: US 12,681,336 B2
(45) Date of Patent: Jul. 14, 2026

(54) METHODS AND DEVICES FOR DETERMINING THE POSITION AND/OR ORIENTATION OF A SPECTACLE LENS ON A MOUNTING

(71) Applicant: Carl Zeiss Vision International GmbH, Aalen (DE)

(72) Inventors: Adalbert Hanßen, Aalen (DE); Elmar Rothe, Oberkochen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 47 days.

(21) Appl. No.: 18/493,918

(22) Filed: Oct. 25, 2023

(65) Prior Publication Data

US 2024/0053622 A1 Feb. 15, 2024

Related U.S. Application Data

(63) Continuation of application No. 16/792,260, filed on Feb. 16, 2020, now Pat. No. 11,835,795, which is a
(Continued)

(30) Foreign Application Priority Data

Aug. 18, 2017 (DE) ........................ 10 2017 118 908

(51) Int. Cl.
*G02C 13/00* (2006.01)
*G01M 11/02* (2006.01)

(52) U.S. Cl.
CPC ....... *G02C 13/003* (2013.01); *G01M 11/0214* (2013.01); *G01M 11/0221* (2013.01); *G01M 11/0242* (2013.01)

(58) Field of Classification Search
CPC ............ G02C 13/003; G01M 11/0214; G01M 11/0221; G01M 11/0242
(Continued)

(56) References Cited

U.S. PATENT DOCUMENTS 3,858,982 A 1/1975 Meckler
4,714,232 A 12/1987 Blot
(Continued)

FOREIGN PATENT DOCUMENTS

CN 1711163 A 12/2005
CN 1813214 A 8/2006
(Continued)

OTHER PUBLICATIONS

Bronstein et al., "Taschenbuch der Mathematik [Handbook of Mathematics]," 25th edition, chapter 4.3, pp. 222 to 225, 1991. Relevance found at least in paragraphs [0093] and [0113] of the instant specification.
(Continued)

*Primary Examiner* — Isiaka O Akanbi
(74) *Attorney, Agent, or Firm* — Qubit IP, PLLC

(57) ABSTRACT

A spectacle lens which has permanent markings is mounted on a mounting, in particular a suction mounting. The apparent location of the permanent markings is detected on the spectacle lens with a detection device. Additionally, the spectacle lens is illuminated eccentrically with respect to an optical axis of the detection device using eccentric light sources. Reflections from the lights sources on the spectacle lens are likewise detected. On the basis of the detected reflections and the apparent location of the permanent markings, the position and/or orientation of the mounted spectacle lens are determined.

33 Claims, 19 Drawing Sheets

Related U.S. Application Data continuation of application No. PCT/EP2018/072302, filed on Aug. 17, 2018.

(58) Field of Classification Search
USPC .......................................... 356/124, 138, 125
See application file for complete search history.

(56) References Cited

U.S. PATENT DOCUMENTS

| | | | |
|---|---|---|---|
| 4,856,234 | A | 8/1989 | Goins |
| 7,267,436 | B2 | 9/2007 | Ito et al. |
| 7,423,741 | B2 | 9/2008 | Hornauer et al. |
| 7,611,242 | B2 | 11/2009 | Zaiser |
| 8,823,926 | B2 | 9/2014 | Hanssen et al. |
| 9,797,804 | B2 | 10/2017 | Glasenapp et al. |
| 10,416,038 | B2 | 9/2019 | Lemaire et al. |
| 2001/0035948 | A1* | 11/2001 | Maeda ............... G01M 11/0242 356/124 |
| 2004/0099971 | A1 | 5/2004 | Su et al. |
| 2006/0192944 | A1 | 8/2006 | Hornauer et al. |
| 2006/0192945 | A1 | 8/2006 | Hornauer et al. |
| 2007/0091262 | A1 | 4/2007 | Watanabe et al. |
| 2007/0264915 | A1 | 11/2007 | Mazoyer |
| 2009/0262302 | A1* | 10/2009 | Chauveau ............ G02C 13/003 351/204 |
| 2009/0295846 | A1 | 12/2009 | Simke |
| 2010/0231923 | A1* | 9/2010 | Ge ........................ G01M 11/025 356/601 |
| 2012/0133951 | A1* | 5/2012 | Heinisch ............ G01B 9/02025 356/498 |
| 2013/0148111 | A1 | 6/2013 | Dangelmaier et al. |
| 2014/0352885 | A1* | 12/2014 | Reignault ........ B29D 11/00317 156/350 |
| 2014/0368813 | A1 | 12/2014 | Molinaro et al. |
| 2015/0273646 | A1 | 10/2015 | Castro et al. |
| 2015/0331256 | A1 | 11/2015 | Baudart |
| 2016/0001414 | A1 | 1/2016 | Dubois et al. |
| 2016/0011434 | A1 | 1/2016 | Dubois et al. |
| 2016/0054196 | A1* | 2/2016 | Glasenapp ........... G01M 11/025 356/601 |
| 2016/0325393 | A1 | 11/2016 | Daimaru et al. |
| 2017/0199395 | A1 | 7/2017 | Baudart et al. |
| 2017/0208229 | A1* | 7/2017 | Anatole ................. B24B 9/148 |
| 2017/0242268 | A1 | 8/2017 | Baudart et al. |
| 2017/0274490 | A1* | 9/2017 | Mechrez .............. B24B 13/005 |
| 2018/0239174 | A1* | 8/2018 | Schön ................. G02C 13/005 |
| 2019/0302485 | A1 | 10/2019 | Tiemann et al. |

FOREIGN PATENT DOCUMENTS

| | | | |
|---|---|---|---|
| CN | 103959142 A | 7/2014 | |
| CN | 104768708 A | 7/2015 | |
| CN | 104903049 A | 9/2015 | |
| CN | 105026133 A | 11/2015 | |
| CN | 105026988 A | 11/2015 | |
| CN | 105690187 A | 6/2016 | |
| CN | 105916669 A | 8/2016 | |
| CN | 106062617 A | 10/2016 | |
| CN | 106425750 A | 2/2017 | |
| CN | 106716232 A | 5/2017 | |
| DE | 10300777 A1 | 7/2004 | |
| DE | 10333426 A | 2/2005 | |
| DE | 102005021654 A1 | 11/2006 | |
| DE | 102007037730 A1 | 2/2009 | |
| DE | 102013219838 A1 | 4/2015 | |
| DE | 102014005281 A1 | 10/2015 | |
| EP | 1245335 A2 | 10/2002 | |
| EP | 2597451 A2 | 5/2013 | |
| EP | 1646855 B1 | 8/2016 | |
| WO | 2014102385 A1 | 7/2014 | |
| WO | 2014131878 A2 | 9/2014 | |
| WO | 2014131879 A1 | 9/2014 | |
| WO | 2017017385 A1 | 2/2017 | |
| WO | 2018028808 A1 | 2/2018 | |

OTHER PUBLICATIONS

Dörband: "Analyse optischer Systeme [Analysis of optical systems]," (Dissertation, Stuttgart), chapters 4.3.1 and 1.3.2, 1986. Relevance found at least in paragraph [0110] of the instant specification.

Dörband et al. "Handbook of Optical Systems," vol. 5, chapter 47.8, pp. 283 to 296, 2012.

Goersch "Handbuch der Augenoptik [Handbook of ophthalmic optics]," pp. 24, 25, 116 to 119, 140 to 145, and p. 18 to 221, published by Carl Zeiss, 7082 Oberkochen, 3rd edition 1987, second reprint 1992, 1992.

Industrial Norm "Augenoptik—Begriffe und Zeichen bei Brillengläsern in Verbindung mit dem menschlichen Auge [Ophthalmic optics—Definitions and symbols of spectacle lenses in connection with the human eye]," DIN 58208:2013-10 subsection 3, Oct. 2013. Relevance found at least in paragraph [0005] of the instant specification.

International Standard: "Robots and robotic devices—Vocabulary," ISO 8373, 2012.

Industrial Norm "Ophthalmic optics—Spectacle lenses—Vocabulary (ISO 13666:2012)," German and English version EN ISO 13666:2012, Oct. 2013.

Industrial Norm "Ophthalmic optics—Uncut finished spectacle lenses—Part 2: Specifications for power-variation lenses," ISO 8980-2, third edition 2017.

Internet citation "Bündelblockausgleichung [Bundle adjustment]," available at the url de.wikipedia.org/wiki/jB%BCndelblockausgleichung and English-language counterpart site thereof, last accessed May 28, 2020.

Internet citation "Finite-Elemente-Methode" [Finite element method], available at the url de.wikipedia.org/wiki/Finite-Flemente-Methode and English-language counterpart site thereof, last accessed May 28, 2020.

Internet citation "Pseudoinverse" [Moore-Penrose inverse], available at the url de.wikipedia.org/wiki/Pseudoinverse and English-language counterpart site thereof, last accessed May 28, 2020.

Internet citation "X-Cube" by TechOptics, available at the url http://www.tecofrance.com/x-cube.html, last accessed May 28, 2020.

Press et al., "Chapter 10. Minimization or Maximization of Functions," Numerical Recipes, Second Edition, pp. 204 to 405, 1992.

Office action by the German Patent and Trademark Office issued in DE 10 2017 118 908.4, which is a counterpart hereof, mailed May 3, 2018.

International Search Report and English-language translation thereof issued in PCT/EP2018/072302, which is a Counterpart hereof, mailed Jan. 2, 2019.

Written Opinion issued in PCT/EP2018/072302, which is a counterpart hereof, posted on patentscope on Feb. 21, 2019, and English translation thereof.

International Preliminary Report on Patentability issued in PCT/EP2018/072302, which is a counterpart hereof, completed Dec. 10, 2019.

Extended European Search Report issued by the European Patent Office in EP 20 167 158.3, which is a counterpart hereof, dated Jul. 16, 2020.

Extended European Search Report issued by the European Patent Office in EP 20 167 155.9, which is a counterpart hereof, dated Sep. 14, 2020.

Extended European Search Report issued by the European Patent Office in EP 20 167 153.4, which is a counterpart hereof, dated Aug. 19, 2020.

Office Action issued by the European Patent Office in EP 18 765 362.1, which is a counterpart hereof, dated Aug. 19, 2020.

Chinese Patent Office action issued in CN201880053429.3, which is a counterpart hereof, mailed Jun. 17, 2021, and English-language translation thereof.

Chinese Patent Office action issued in CN201880053429.3, which is a counterpart hereof, mailed May 24, 2022, and English-language translation thereof.

Official communication issued by the German Patent and Trademark Office in DE 10 2017 118 908.4, which is a Counterpart hereof, dated Oct. 19, 2022, and English-language translation thereof.

(56)          References Cited

OTHER PUBLICATIONS

Laurent "Automatic Lens Power Mapping by Transmission and Reflection," Based on a Lecture Given at MAFO—The Conference in Milan, May 8, 2008.
Laurent "The Dual Mapping Method Power Mapping for Process Control and Inspection of Freeform Lenses," Reprint from MAFO vol. 8, D27, published 2011.
Dual lens meter user manual, Automation & Robotics S.A., Jan. 2014.
Laurent "Accurate positioning for lens quality and cost savings," public presentation given at conference 44th MIDO 2014, Milan, Mar. 1 through 3, 2014.
Larrue et al. "A Comparison of Four Different Lens Mappers", Optometry and Vision Science, vol. 91, No. 11, published Nov. 2014.
Opposition proceeding before the EPO in European counterpart application 20167155.9, which is a counterpart hereof, mailed Jul. 5, 2022, and English-language machine translation thereof.

* cited by examiner

METHODS AND DEVICES FOR DETERMINING THE POSITION AND/OR ORIENTATION OF A SPECTACLE LENS ON A MOUNTING

CROSS REFERENCE TO RELATED APPLICATIONS

This application is a continuation application of U.S. patent application Ser. No. 16/792,260, filed Feb. 16, 2020, now U.S. patent application publication 2020/0183193 A1, which is a continuation of international patent application PCT/EP2018/072302, filed Aug. 17, 2018, designating the United States and claiming priority from German patent application DE 10 2017 118 908.4, filed Aug. 18, 2017, and the entire content of all applications is incorporated herein by reference.

TECHNICAL FIELD

The present disclosure relates to methods and devices for determining a position and/or orientation of a spectacle lens on a holder. In particular, the present disclosure relates to such methods and devices in which the position and/or orientation of the spectacle lens are/is determined in order to be able to apply a stamp figure correctly on the spectacle lens. In this case, position is understood to mean the location at which an object is situated in space. Orientation specifies the orientation of the object at this location. Sometimes, particularly in robotics, the combination of position and orientation is also referred to as pose (cf. DIN EN ISO 837:2012-03).

BACKGROUND

In the course of fitting spectacle lenses by grinding, an optician uses reference points on the spectacle lens. In this case, fitting by grinding denotes a process in which the spectacle lens is made to fit approximately and is centered for a chosen frame. Prior to fitting by grinding, spectacle lenses typically have a circular or an elliptic shape. The fitting by grinding thus gives the spectacle lens a shape which fits in the chosen frame. In this case, the centering correctly orients the spectacle lens, such that the intended optical power is achieved for the person who ultimately wears the spectacles.

In this case, for spherical or toric spectacle lenses, the reference points on the spectacle lens are ascertained under a lensmeter and are marked by a marking device, also referred to as dotting unit, on the spectacle lens (see, e.g., "Handbuch der Augenoptik" ["Handbook of ophthalmic optics"], published by Carl Zeiss 7082, Oberkochen, revised by Dr. Helmut Goersch, 3rd edition 1987, page 220). What is used here as reference point is, in particular, an optical center point at which a perpendicularly incident ray passes through the spectacle lens without being refracted.

In the case of progressive lenses, this simple reconstruction of reference points by means of a lensmeter is not possible, or is not possible in a straightforward manner. The reference points of a progressive lens are not defined as in the case of a spherical or toric lens, in the case of which the optical center point mentioned above can be used as reference point. Rather, in the case of progressive lenses, reference points are points whose location is defined by a design of the spectacle lens. Reference points are, e.g., the near reference point (cf. DIN 58208:2013-10 subsection 3), the distance reference point (cf. DIN EN ISO 13666: 2012;

subsections 5.15) and the prism reference point (cf. DIN EN ISO 13666: 2012, subsections 14.2.12) of a progressive spectacle lens. These reference points cannot be determined by lensmeters.

The spectacle lens designer can freely define the location of the distance reference point or near reference point and also that of the prism reference point. The individual spectacle lens manufacturers have evolved conventions in respect of this, which are not necessarily the same for all spectacle lenses from their product range, but may even differ according to product type. The manufacturers' technical documentation describes where these reference points lie on the lens.

At the prism reference point, it is customary to measure the prescribed prismatic power superimposed with the thickness reduction prism, which is identical for both eyes and acts only in the vertical direction. The thickness reduction prism is intended to reduce the thickness of the spectacle lens and is explained on page 118 of "Handbuch fur Augenoptik" cited above. The prismatic measurement values which result from this measurement (indicated, e.g., as prism in cm/m and base as angle in the TABO (German abbreviation—Technischer Ausschuss fur Brillengläser [Technical Committee for Spectacle Lenses]) scheme; angles are unambiguously defined by means of the scheme) and which a spectacle lens is intended to have are indicated on the packaging.

Unlike in the case of the optical center point of a spherical or toric spectacle lens, for progressive lenses there is no ray deflection of zero defined by a standard at any of the reference points; moreover, no standard requires a measurement using a lensmeter to yield a minimum of a measured astigmatic power there.

According to the standard DIN EN ISO 898-2 (2004) section 7.1, progressive lenses are therefore provided with two permanent marks (see also DIN EN ISO 13666: 2012 14.2). Since the permanent marks were formerly applied as engravings, they are also referred to colloquially as permanent engravings. Since they are often applied using lasers nowadays, the term signing or signature mark is also common for all kinds of marks on the spectacle lens. The point in the middle between these permanent marks is referred to as ERP (standing for Engraving Reference Point). In the case of progressive lenses from ZEISS, the ERP is at the same time the prism reference point mentioned above. The permanent marks lie, e.g., 17 millimeters to the right and left of the ERP.

The locations of the permanent marks can be used to reconstruct a coordination system on the spectacle lens: The middle in between the locations (when viewed perpendicularly from the front side of the lens) determines the coordinate origin; the direction from the left permanent mark to the right permanent mark determines the positive x-direction. The position of the reference points mentioned above is then usually specified in this coordinate system by spectacle lens manufacturers.

By way of example, the near and distance reference points lie in such a coordinate system at points defined by the manufacturer. The near and distance reference points play a part if the power of a progressive spectacle lens is intended to be measured again: The measurement values which must then occur at these two points are those which were determined by the optical designer before the production of the spectacle lens and which are usually indicated in the documents associated with the spectacle lens, for example on the packaging.

Moreover, DIN EN ISO 8980-2 (2004), in section 7.2, also recommends a non-permanent identification (i.e., an identification which can be removed, such that it is no longer present in the finished spectacles), which is referred to colloquially as stamping or stamp figure, even if it is applied on the spectacle lens by other methods, for example an inkjet printing method, instead of a stamp. The term "stamping" is used hereinafter to refer to the non-permanent identification in accordance with DIN EN ISO 8990-2 (2004), section 7.2.

The stamping contains:

1. a mark serving for the orientation of the spectacle lens,
2. a mark of the distance reference point,
3. a mark of the near reference point,
4. a mark for the fitting point, and
5. a mark for the prism reference point.

In the stamping, distance reference point, near reference point, and/or prism reference point can be marked by thick circles in order that only the correct circular region takes effect around these points upon measurement using a lensmeter. As a result, precisely the aperture defined by the circles takes effect upon remeasurement using a lensmeter, which facilitates the remeasurement.

The stamping has to be applied consistently with respect to the permanent marks because an optician will rely on the correctness of the stamping when fitting the spectacle lens by grinding and centering it. In this case, applied consistently means that the marks of the stamping have to be at the correct position defined by the spectacle lens manufacturer in the coordinate system defined by the permanent marks as explained above. Applying the stamping inaccurately with regard to the position could then result in location or orientation errors of the spectacle lens, i.e., the spectacle lens would then not be correctly incorporated into the spectacle frame if the optician relies on the correct location of the stamping. A centering error is understood here to mean a displacement of the spectacle lens (change in the lateral location and/or fitting height) relative to the correct position, and an orientation error is understood to mean a rotation relative to the correct orientation. However, these designations are not used in a standardized way in publications, and sometimes the term centering error is also used overarchingly for centering errors as defined above and orientation errors. Explanations in this respect can also be found on page 140 et seq. of "Handbuch der Augenoptik" already cited above.

Centering errors and orientation errors can adversely affect the usability of the finished spectacles. Effects caused by such location errors or by orientation errors are critical primarily in the case of spectacle lenses having optical powers with relatively large absolute values, since, in the case thereof, centering errors can result in prismatic effects, which are undesirable. The magnitude of prismatic effects as a result of centering errors can be calculated using the Prentice formula.

In the case of spectacle lenses intended for correcting relatively large astigmatism, an orientation error has a more severe effect than in the case of a spectacle lens without or with little astigmatism to be corrected. In the case of progressive lenses, the effect of an orientation error in the case of relatively high addition is also more severe than in the case of lenses with low addition. Addition here denotes the near addition of a progressive lens. An additional factor in the case of progressive lenses is that as a result of a horizontal decentration of both spectacle lenses in non-identical directions (i.e., both spectacle lenses are displaced differently relative to a correct position), the so-called progression channel is no longer attained by both eyes during use. The user may then see an object situated in the transition region between near and distance zones only with one eye through the associated progression channel, and for the other eye the user uses a location alongside that, where astigmatic and other image aberrations are disturbing. The progression channel lies between the distance reference point and the near reference point and is designed such that optimum visual conditions are experienced there for the associated viewing directions of both eyes. Vertical decentrations in non-identical directions (i.e., displacements) also adversely affect the visual impression for the wearer of spectacles: The spectacle lenses no longer act in the way in which they were calculated. The visual impression for both eyes is primarily disturbed by centering errors.

When fitting spectacle lenses by grinding and mounting, a high accuracy is required, which in some instances results from standards or is defined by manufacturers. By way of example, maximum deviations for the centering are stipulated in point 5.2.4 in DIN EN ISO 8980-2. A range of ±0.5 millimeter in the horizontal and vertical directions may typically be required as centering accuracy. For single-vision lenses, a tolerable angular error is dependent on the cylindrical power (cylinder in accordance with DIN EN ISO 13666: 2012) of the spectacle lens. According to DIN EN ISO 8980-2, the maximum allowed error during centering is dependent on the strength of the optical power of the spectacle lens, in particular on the refractive power in the more highly refractive principal meridian. In the case of progressive lenses, an orientation error near the limits of the standard mentioned is on no account permissible—even with small prescription cylinder, i.e., small cylinder prescribed in the prescription. The best visual impression arises for the user when no centering and no orientation errors are present: The optician should therefore work as accurately as he/she is able.

For applying the stamping, the accuracy is usually required independently of the power. What is required here is an accuracy of ±0.3 millimeter for the centering (i.e., position in the horizontal and vertical directions) and of ±1 degree for the orientation (i.e., rotation about an axis that is substantially perpendicular to the spectacle lens, also referred to hereinafter as the z-direction).

Surfaces responsible for the progressive power of a progressive spectacle lens (also referred to as progressive surfaces) are usually applied nowadays on the back side of spectacle lenses. Therefore, these spectacle lenses are also called "back side progressive" (BSP). In this case, the back side of the spectacle lens is that side of the spectacle lens which faces the eye. In the case of progressive lenses, the permanent marks are usually applied on that side of the spectacle lens which brings about the progressive power, that is to say nowadays thus usually on the back side of the spectacle lens. This is because during the production of the progressive surface the spectacle lens is blocked, i.e., applied on a holder, and the block piece precisely defines the coordinate system on the spectacle lens and on the progressive surface. In this case, the block piece having a diameter of usually 43 millimeters is situated on that side of the spectacle lens which is not processed: that is to say nowadays usually on the front side of the spectacle lens. In the blocked state of the spectacle lens, it is therefore simple to apply the permanent marks at the correct locations (e.g., ±17 millimeters with respect to the ERP) since the coordinate system in the blocked state is accurately defined and mechanically embodied. In the case of BSP lenses, the block piece, owing to its size, conceals the locations for the permanent mark, however, if there were a desire to apply them on the front side of the spectacle lens. Therefore, they are applied at the locations at which a ray incident parallel to the normal direction at the ERP on the front side of the spectacle lens at the prescribed locations would leave the spectacle lens again. In the correct pose, that brings about later the correct "apparent location" of the permanent marks. This location ensures that the permanent marks, viewed from the correct direction, appear exactly at the prescribed locations on the front side of the spectacle lens.

The back side of the spectacle lens usually has a concave shape and the front side of the spectacle lens a convex shape. In the case of most progressive spectacle lenses, the permanent marks are thus applied on the concave side of the spectacle lens.

In the case of the formerly customary spectacle lenses that were produced in the "semifinished product method", the front side of the spectacle lens brought about the progressive function. Therefore, these lenses are also called "front side progressive" (FSP). Therefore, the permanent marks in the case of progressive spectacle lenses were formerly always situated on the front side of the spectacle lens. Therefore, in a case in which the permanent marks are applied on the concave side of the spectacle lens, the specification for the optician stipulates that the spectacle lenses are to be dotted (i.e., marked) on the convex front side of the spectacle lens where the permanent marks appear on the front side of the spectacle lens when the spectacle lens is viewed from infinity perpendicular to the front surface at the lens midpoint. (The lens midpoint here is the point in the middle between both permanent marks, that is to say the ERP. Instead of viewing from infinity, in practice it is sufficient to maintain a viewing distance of at least 400 millimeters.) By contrast, FSP spectacle lenses can be dotted on the front side directly on the marks.

When the stamping is applied in an automated device, the spectacle lens is held by suction on the concave side, that is to say at the back side of the spectacle lens in the case of progressive lenses, for example by means of a suction holder. The lateral location of the holding point, that is to say of the point of intersection between the suction holder axis and the back surface of the spectacle lens, and the orientation of the spectacle lens are unknown in this case. The position and orientation of the spectacle lens held by suction in this way result from the complicated interplay between suction holder and spectacle lens. They are dependent on the holding point. One device which is used to apply a stamping and which uses a suction holder is sold under the designation "X-Cube" by Tecoptique, see www.tecofrance.com/x-cube.html.

In the case of a spectacle lens held exactly in the center, the direction of the suction holder still corresponds very well to the normal direction of the concave back side of the spectacle lens held by suction at the midpoint of the suction holder. If the spectacle lens is held in a decentered manner, the weight of the spectacle lens causes moments on the suction holder, which yields somewhat as a result. Therefore, the spectacle lens can then be seated on the suction holder in a tilted manner.

In most cases the back side of the spectacle lens is not spherical. If it is toric, the orientation of the spectacle lens held by suction is indeterminate to an even greater extent. From symmetry considerations it is deducible that the direction of the suction holder when holding a toric surface by suction is still approximately in the normal direction at the midpoint of the suction holder. Deviations therefrom occur once again as a result of moments brought about by the gravitational force, in particular by the weight of the spectacle lens. Unlike in the case where a spherical surface is held by suction, however, the suction holder yields to different extents to moments in the meridional section and in the rotational section.

Specifically, the sectional figure of a cylindrical surface with the cylinder axis parallel to the direction of the suction holder, in the case of a toric surface and perpendicular orientation of the sucker on it, is an approximately sinusoidal curve in the z-direction. This will be explained briefly with reference to FIGS. 1A to 1D.

FIG. 1A shows an illustration of a toric surface 10 as an example of a concave back side of a spectacle lens. The reference sign 11 shows the section of a cylinder with the toric surface. The cylinder represents the suction holder. In the case of FIG. 1A, the toric surface is oriented perpendicularly to the cylinder representing the suction holder. Along the section 11, a height in the z-direction arises as illustrated as curve 12 in FIG. 1B. FIG. 1C shows a non-perpendicular orientation of the cylinder on the surface 10, which results in a sectional line 13. In FIG. 1D, a curve 14 shows the height along the sectional line 13.

Compared with the curve 12, the curve 14 is clearly not sinusoidal, that is to say that it clearly deviates from a sinusoidal shape.

This effect, i.e., the variation of heights along sectional curves, is illustrated once again in FIGS. 2A and 2B. FIG. 2A illustrates a family of curves 15, wherein the individual curves of the family of curves 15 show the height profile in the z-direction along a sectional line (e.g., 12 or 13) which is displaced from line to line by 2 millimeters in the x-direction on the surface 10. Similarly, in FIG. 2B, a family of curves 16 shows the height profile in the case of a displacement in the y-direction in steps of 1 millimeter (the x- and y-directions are indicated in FIGS. 1A and 1C). As a result of the elasticity of the suction holder used, the peaks and valleys of the curves shown mutually compensate for one another during holding by suction. An approximately perpendicular direction of holding by suction as in FIGS. 1A and 1B is finally established.

The relationships are more complicated in the case of a freeform surface, such as a progressive surface on the back side of a progressive spectacle lens. In this case, the sectional curve of a cylinder with the freeform surface may indeed be a curve still similar to that as illustrated for toric surfaces in FIGS. 1A to 1D and 2A and 2B, but is no longer exactly a curve of this type. The width of the "peaks" and "valleys" in the z-direction along sectional lines is no longer identical. Therefore, in the case of a progressive surface, a direction of holding by suction is established which is more difficult to predict and which depends not only on the shape of the progressive surface but also to a great extent on mechanical properties of the suction holder. Therefore, the exact spatial location of the spectacle lens on the suction holder is not easily predictable.

If the permanent marks, as explained above, are applied on the back side of the spectacle lens, they appear on the front side of the spectacle lens, to which the stamping is intended to be applied, at a location that depends on the light refraction by the spectacle lens. This position can vary depending on orientation. This makes an accurate positioning of the stamping more difficult or impossible if the pose of the lens is disregarded in the measurement.

EP 1 646 855 B1 and EP 2 597 451 A2 each disclose a method and an illumination arrangement with which permanent marks can be made visible and can be detected by a camera. On account of the above-described effect of light refraction, however, the location of the permanent marks thus detected differs from the actual location of the permanent marks and depends in particular on the orientation of the spectacle lens on the holder. The location of the permanent marks in the camera image, the location being primarily determined by such a device, is also referred to as "apparent location" in the context of this application.

DE 103 00 777 A1 describes centering a spectacle lens on the basis of permanent marks, referred to therein as engraving marks. In that case, too, on account of the effect of light refraction, it can happen that an apparent location of the engraving marks is detected which deviates from an actual location.

DE 10 2007 037 730 A1, from which the present disclosure proceeds, solves this problem by applying marks both on the front side of the spectacle lens and on the back side of the spectacle lens. The spectacle lens can then be positioned correctly with knowledge of the three-dimensional positional relationship.

What is disadvantageous in that case is that to that end marks have to be applied both on the front side of the spectacle lens and on the back side of the spectacle lens, which can be complicated in the case of accurate position requirements, and the procedure of DE 10 2007 037 730 A1 can be employed only in the case of spectacle lenses provided with marks especially in that way, but not in the case of conventional spectacle lenses provided only with permanent marks as described above.

SUMMARY

It is an object of the present disclosure to provide methods and devices for determining the position and/or orientation of a spectacle lens on a holder, for example, a suction holder as described above, which are also useable with spectacle lenses provided with permanent marks only in a conventional manner. Furthermore, it is an object to apply a stamping to a spectacle lens in a correct position, even if the spectacle lens lies on a holder in a tilted or rotated manner.

DE 10 2014 005 281 A1 describes a device and a method for the non-contact detection of a position of at least one spectacle lens provided with permanent marks in three-dimensional space on a holder. In accordance with the teaching of DE 10 2014 005 281 A1, the spectacle lens is illuminated and recorded by two spatially differently arranged cameras. The real location of the marks is determined, wherein the marks can be illuminated in transmission through the spectacle lens, but the marks of the spectacle lens always face the camera. In a computation step, the position of the spectacle lens is then determined from the various camera recordings.

DE 10 2013 219 838 A1 describes the cooperation of three measuring stations for measuring an object, for example a spectacle lens having a first optically active surface and a second optically active surface, wherein the spectacle lens can have a mark. DE 10 2013 219 838 A1 describes a method for determining the position and/or orientation of a spectacle lens having permanent marks and being held on a holder. The first measuring unit determines the location of three points on first and second optically active surfaces with respect to a fixed coordinate system by means of tactile measurement probes. In the second measuring station, the real location of the mark is detected by means of a camera recording. For this purpose, the mark has to be arranged on the side of the spectacle lens facing the camera. An alternative embodiment discloses an upper and a lower device, such that it is possible to detect marks of a spectacle lens on both sides, wherein the respective device detects the real location of the mark on the side respectively facing the sensor. In a third measuring station, the topography of first and second optically effective surfaces is detected.

For the teachings of both DE 10 2014 005 281 A1 and DE 10 2013 219 838 A1, it is necessary for the camera units that record images of the marks to observe the real position of the marks, that is to say for the light emanating from the mark not to be refracted up to the first optically effective surface of the camera, for example of the camera lens. The spectacle lenses thus each have to be oriented such that the side with the permanent marks is oriented toward the observation side. This may be disadvantageous—in a manner similar to that as in the case of the above-described methods of EP 1 646 855 B1 and der EP 2 597 451 A2—because it restricts the freedoms in the arrangement of the lens element and restricts possibilities for mounting spectacle lenses. This may be problematic particularly in the case of the back side progressive spectacle lenses mentioned above because the latter often have permanent marks exclusively on the back side. The restrictions have the effect that, for example, opaque materials cannot be used for the holder, which may be disadvantageous for the material properties particularly in the case of suction cup holders.

In this case, an opaque material is understood to mean a material which is light-nontransmissive in the used wavelength range of the light, for example because it greatly absorbs and/or reflects the relevant light.

Firstly, methods of various aspects of the disclosure are presented below. Corresponding devices are likewise provided. Details and explanations are subsequently presented with regard to the respective aspects of the disclosure or combinations thereof.

Proceeding from DE 10 2014 005 281 A1, it is a first object of the disclosure to provide methods, devices, and computer programs which are able to allow the determination of the position and/or orientation of a back side progressive spectacle lens having permanent marks even when the lens is held on a nontransparent holder.

In accordance with a first aspect of the disclosure, the first object is achieved by means of a method for determining the position and/or orientation of a spectacle lens having permanent marks and being held on a holder, wherein the apparent location of the permanent marks differs from a real location of the permanent marks and a device for determining the position and/or orientation of a spectacle lens having permanent marks and being held on a holder, wherein the apparent location of the permanent marks differs from a real location of the permanent marks. Further exemplary embodiments and also a computer program for carrying out the method with the aid of a computing unit are discussed below.

Proceeding from DE 10 2013 219 838 A1, it is a second object of the disclosure to provide methods and devices which enable robust position and/or orientation determination. In accordance with a second aspect of the disclosure, this is achieved by a method and a device for determining the position and/or orientation of a spectacle lens having permanent marks and being held on a holder on the basis of the apparent location of the permanent marks and mark-independent additional information. A computer program for carrying out the method with the aid of a computing unit is also disclosed.

Proceeding from DE 10 2014 005 281 A1, it is a third object of the disclosure to provide methods and devices which enable refraction properties of the spectacle lens to be deduced. In accordance with a third aspect of the disclosure, this is achieved by a method and a device for determining the position and/or orientation of a spectacle lens having permanent marks and being held on a holder carried out from a plurality of observation directions, wherein the apparent location of the permanent marks differs from a real location of the permanent marks. A computer program for carrying out the method with the aid of a computing unit is also disclosed.

Proceeding from DE 10 2013 219 838 A1, it is a fourth object of the disclosure to provide methods and devices which enable refraction properties of the spectacle lens to be deduced. In accordance with a fourth aspect of the disclosure, this is achieved by a method and a device for determining the position and/or orientation of a spectacle lens having permanent marks and being held on a holder, wherein the location of at least one reflection is carried out from a plurality of observation directions. A computer program for carrying out the method with the aid of a computing unit is also disclosed.

Likewise proceeding from DE 10 2013 219 838 A1, it is a fifth object of the disclosure to provide methods and devices for simplifying the complexity of the device and/or method from DE 10 2013 219 838 A1. In accordance with a fifth aspect of the disclosure, this is achieved by a method and a device for determining the position and/or orientation of a spectacle lens having permanent marks and being held on a holder by detecting the apparent location of at least one reflection on the spectacle lens repeatedly during a movement of the spectacle. A computer program for carrying out the method with the aid of a computing unit is also disclosed.

Once again proceeding from DE 10 2013 219 838 A1, it is a sixth object of the disclosure to be able to carry out the method from DE 10 2013 219 838 A1 more rapidly and to be able to achieve a higher accuracy of the method. In accordance with a sixth aspect of the disclosure, this is achieved by a method and a device for determining the position and/or orientation of a spectacle lens having permanent marks and being held on a holder performing an iterative calculation of the position and/or orientation of the spectacle lens. A computer program for carrying out the method with the aid of a computing unit is also disclosed.

Proceeding from DE 10 2014 005 281 A1, it is a seventh object of the disclosure to improve the accuracy of the method and devices from DE 10 2014 005 281 A1 and to enable different holders to be used. In accordance with a seventh aspect of the disclosure, this is achieved by a method and a device for determining the position and/or orientation of a spectacle lens having permanent marks and being held on a holder using mark-independent additional information. A computer program for carrying out the method with the aid of a computing unit is also disclosed.

In accordance with all aspects of the disclosure, a method for determining the position and/or orientation of a spectacle lens having permanent marks and being held on a holder is provided, comprising:

providing detected apparent locations of the permanent marks on the spectacle lens, and determining the position and/or orientation of the spectacle lens on the basis of the detected apparent location of the permanent marks and mark-independent additional information.

In accordance with the first aspect of the disclosure, a method for determining the position and/or orientation of a spectacle lens having permanent marks and being held on a holder is provided. The method comprises: providing a detected apparent location of the permanent marks on the spectacle lens. Furthermore, the method comprises determining the position and/or orientation of the spectacle lens on the basis of the apparent location of the permanent marks and mark-independent additional information.

The method of the first aspect of the disclosure is characterized in that the apparent location of the permanent marks differs from a real location of the permanent marks.

One advantage of the first aspect of the disclosure vis à vis DE 10 2014 005 281 A1 is that the measurement does not have to be carried out from the side of the permanent marks. This makes it possible to use nontransparent holders, e.g., suction cups in the case of back side progressive spectacle lenses, in which the marks are applied on the back side. The progressive spectacle lenses can then likewise be held at the back side, as described above.

In accordance with the second aspect of the disclosure, a method for determining the position and/or orientation of a spectacle lens having permanent marks and being held on a holder is provided. The method comprises: detecting an apparent location of the permanent marks on the spectacle lens, eccentrically illuminating the spectacle lens and detecting a location of at least one reflection caused by the eccentrically illuminating process on the spectacle lens.

Furthermore, the method of the second aspect of the disclosure comprises determining the position and/or orientation of the spectacle lens on the basis of the apparent location of the permanent marks and mark-independent additional information, wherein the mark-independent additional information comprises the apparent location of the at least one reflection.

The method of the second aspect of the disclosure includes detecting the location of the permanent marks is carried out with a first light wavelength and detecting the location of the at least one reflection is carried out by means of illumination with a second light wavelength, wherein the spectacle lens has a higher absorption for the second light wavelength than for the first light wavelength.

One advantage of the second aspect of the disclosure vis à vis DE 10 2013 219 838 A1 is that reliable differentiation of reflections from the front side of the spectacle lens from reflections from the back side of the spectacle lens is made possible.

In accordance with the third aspect of the disclosure, a method for determining the position and/or orientation of a spectacle lens having permanent marks and being held on a holder is provided. The method comprises: detecting an apparent location of the permanent marks on the spectacle lens, determining the position and/or orientation of the spectacle lens on the basis of the apparent location of the permanent marks and mark-independent additional information.

The method of the third aspect of the disclosure is characterized in that detecting the apparent location of permanent marks is carried out from a plurality of observation directions, wherein the apparent location of the permanent marks differs from a real location of the permanent marks.

One advantage of the third aspect of the disclosure vis à vis DE 10 2014 005 281 A1 is that observations of the apparent location of the permanent marks from different directions enable refraction properties of the spectacle lens to be deduced. This is not disclosed in DE 10 2014 005 281 A1 because there the refraction properties of the spectacle lens are of no significance.

In accordance with the fourth aspect of the disclosure, a method for determining the position and/or orientation of a spectacle lens having permanent marks and being held on a holder is provided. The method comprises: detecting an apparent location of the permanent marks on the spectacle lens, eccentrically illuminating the spectacle lens and detecting a location of at least one reflection caused by the eccentrically illuminating process on the spectacle lens. Furthermore, the method of the fourth aspect of the disclosure comprises determining the position and/or orientation of the spectacle lens on the basis of the apparent location of the permanent marks and mark-independent additional information, wherein the mark-independent additional information comprises the location of the at least one reflection.

The method of the fourth aspect of the disclosure is characterized in that detecting the location of the at least one reflection is carried out from a plurality of observation directions, wherein the apparent location of the permanent marks differs from a real location of the permanent marks.

One advantage of the fourth aspect of the disclosure vis à vis DE 10 2013 219 838 A1 consists in an increase in the accuracy and/or in the fact that the method converges more rapidly. It is thereby possible to increase the quality and efficiency of the method vis à vis DE 10 2013 219 838 A1

In accordance with the fifth aspect of the disclosure, a method for determining the position and/or orientation of a spectacle lens having permanent marks and being held on a holder is provided. The method comprises: detecting an apparent location of the permanent marks on the spectacle lens, eccentrically illuminating the spectacle lens and detecting a location of at least one reflection caused by the eccentrically illuminating process on the spectacle lens. Furthermore, the method of the fifth aspect of the disclosure comprises determining the position and/or orientation of the spectacle lens on the basis of the apparent location of the permanent marks and mark-independent additional information, wherein the mark-independent additional information comprises the location of the at least one reflection on the spectacle lens.

The method of the fifth aspect of the disclosure includes detecting the apparent location of the at least one reflection on the spectacle lens comprises detecting repeatedly during a movement of the spectacle lens.

One advantage of the fifth aspect of the disclosure vis à vis DE 10 2013 219 838 A1 is that it is not necessary to arrange a large number of light sources on a polyhedral surface. The measurement can be carried out using a single light source.

In accordance with the sixth aspect of the disclosure, a method for determining the position and/or orientation of a spectacle lens having permanent marks and being held on a holder is provided. The method of the sixth aspect of the disclosure comprises providing a detected apparent location of the permanent marks on the spectacle lens and determining the position and/or orientation of the spectacle lens on the basis of the apparent location of the permanent marks and mark-independent additional information.

The method of the sixth aspect of the disclosure includes the position and/or orientation of the spectacle lens comprises an iterative calculation of the position and/or orientation of the spectacle lens.

One advantage of the sixth aspect of the disclosure vis à vis DE 10 2013 219 838 A1 is that the method can be carried out more rapidly by means of the iterative procedure and at the same time yields a higher accuracy of the result.

In accordance with the seventh aspect of the disclosure, a method for determining the position and/or orientation of a spectacle lens having permanent marks and being held on a holder is provided. The method of the seventh aspect of the disclosure comprises providing a detected apparent location of the permanent marks on the spectacle lens and determining the position and/or orientation of the spectacle lens on the basis of the apparent location of the permanent marks and mark-independent additional information.

In the method of the seventh aspect of the disclosure, the mark-independent additional information comprises calculated or experimentally ascertained location properties of different shapes of spectacle lenses on the holder, wherein the location properties comprise holding characteristics of the holder.

One advantage of the seventh aspect of the disclosure vis à vis DE 10 2014 005 281 A1 is that holding characteristics are concomitantly taken into account, which increases the accuracy of the method vis à vis DE 10 2014 005 281 A1.

The individual features of the various aspects of the disclosure will now be explained and defined in greater detail below.

The apparent location of permanent marks is, as set out above, the location which is ascertained by observation of the spectacle lens by means of a camera unit if the permanent marks are applied on a back side of the spectacle lens and the observation is effected from the front side of the spectacle lens.

Detecting the apparent location can be carried out for example as described in EP 1 646 855 B1 or EP 2 597 451 A2. Providing encompasses the case that detecting the apparent location of the permanent engravings can be carried out at a different location than the determination of the position and/or orientation and that the detecting can also have been initiated by a different person compared with carrying out the computer-implemented method. By way of example, calculations of the method in the context of this application can be carried out on a remote computer with which communication is effected via a network.

In this case, mark-independent additional information should be understood to mean information independently of the detected apparent location of the permanent marks and also independently of other marks and properties of these marks, such as the relative location of marks, for example, from which the location and/or position can be derived. Such mark-independent additional information thus does not require a specific location of marks such as permanent marks on the spectacle lens. Such mark-independent additional information can be based for example on measurements or else on calculations on the basis of properties of the holder and of the spectacle lens. The measurements and/or optionally calculations can in turn have been initiated at a different location and by a different person compared with carrying out the method according to the disclosure.

In this way, it is possible to extend techniques known per se for detecting the apparent location of the permanent marks using the mark-independent additional information to the effect of determining the position and/or location of the spectacle lens. Use of mark-independent additional information means that no specific mark of the spectacle lens is required, and the method is applicable to spectacle lenses having conventional permanent marks.

The position and/or orientation can be specified with the aid of coordinate systems, which will now be explained. These coordinate systems are also used for later explanations in this application. A spectacle lens is associated with a coordinate system (also referred to hereinafter as spectacle lens coordinate system), in which all indications about the spectacle lens are made. The origin (=zero point) of the spectacle lens coordinate system is formed by the point that lies exactly midway between the two (apparent) locations of the permanent marks. This point is also called the engraving reference point or ERP. If the permanent marks are actually applied on the convex surface (which, for the reasons described above, is rather rare nowadays and actually still occurs only in the case of FSP lenses), the zero point is the actual center point of the shortest connecting curve on the front surface (=convex surface) between the two marks. In the case of spectacle lenses in which the marks are applied on the back side (=concave surface) of the spectacle lens, the apparent points on the front side of the spectacle lens when viewed from the correct direction play this part in the definition of the coordinate system. The xy-plane of the spectacle lens coordinate system is the tangential plane to the spectacle lens at the ERP. The z-direction of the spectacle lens coordinate system corresponds to the above-explained prescribed viewing direction for lenses having permanent marks on the back side of the spectacle lens and is the perpendicular to the xy-plane. If the (apparent) locations of the permanent marks are projected into the xy-plane, the connecting line thereof determines the x-direction of the spectacle lens coordinate system. The permanent marks are distinguishable from one another by additional indications near them. One is identified as the "left" and the other as the "right" permanent mark. The direction sense from the left to the right projected (apparent) permanent mark determines the counting sense of the x-axis. The y-axis lies in the xy-plane=tangential plane to the front surface of the spectacle lens at the ERP perpendicular to the x-axis, specifically with a rotation by 90° in the counterclockwise direction as viewed from the front. The counting sense of the z-axis is expediently defined such that the x-, y- and z-axes produce a right-handed system. The position of the spectacle lens relates to the "world coordinate system" of the device, i.e., it relates to an external, fixedly predefined coordinate system. The orientation encompasses, in particular, the rotation angle about the z-axis of the world coordinate system which is necessary to convert the direction of the x-axis of the spectacle lens into the x-axis of the world coordinate system.

The holder primarily also defines the height of the spectacle lens in the device, which plays a part in image recognition processes. If the high outlay of a telecentric lens is saved, the distance between the spectacle lens to be measured and the camera has some influence on the size of the image. Correct design and, if necessary, height displacement of the suction holder ensure that the spectacle lens is held approximately at the correct height during the measurement. As a result of the definition of the coordinate origin to be determined at the ERP, the method according to the disclosure is insensitive visa vis small incorrect positionings in terms of height in the device because the method can take account of the properties known from the spectacle lens itself. A simple coordinate determination, by contrast, which ascertains the lateral position only from the deviation of the average value of the coordinates—measured in the camera image—of both permanent marks e.g., from its desired location in the camera image, yields erroneous results that are avoided by the method according to the disclosure.

Typically, the method in some aspects of the disclosure furthermore comprises:

detecting the apparent location of the permanent marks,
  eccentrically illuminating the spectacle lens, and
  detecting a location of at least one reflection caused by the eccentrically illuminating process on the spectacle lens, wherein the mark-independent additional information comprises the location of the at least one reflection.

Eccentrically illuminating the spectacle lens is understood to mean illuminating by means of an additional light source, which does not lie on the optical axis, by way of which the location of the permanent marks and then also of the reflection is detected, in particular an optical axis of a camera unit used for detecting the apparent location of the permanent marks. In this case, the optical axis generally denotes an imaginary line defining the propagation of light through an optical system. In the case of rotationally symmetrical optical systems, the optical axis coincides with the axis of symmetry. For a system composed of lens elements and mirrors such as is used in camera units, the optical axis passes through the centers of curvature of the lens elements and mirrors. In this respect, see also the Wikipedia article "Optical Axis" in the English-language version of Wikipedia, as of Jul. 14, 2017.

In this way, the mark-independent additional information can be obtained by a simple detection of a reflection using comparatively simple means. If, e.g., a BSP spectacle lens is mounted on the suction holder in a manner displaced laterally in various positions, then that brings about not only the translation, manifested substantially as translation during the detection of the location of the permanent marks, but also a tilting of the spectacle lens. The tilting also has an—albeit generally small—additional influence on the apparent location of the permanent marks. The tilting primarily brings about a significant change in the detected location of the at least one reflection. The detected locations of permanent marks and of the at least one reflection thus "proceed" differently in the case of tilting and this provides mark-independent additional information about the pose of the entire spectacle lens.

For detecting the location of the at least one reflection, it is possible to use the same camera as for detecting the location of permanent marks in accordance with EP 1 646 855 B1 mentioned above or EP 2 597 451 A2. In these documents, as mentioned, for the purpose of detecting the apparent location of the permanent marks, the spectacle lens is illuminated coaxially with respect to the camera by the light from a light source being specularly reflected onto the optical axis of the camera by a beam splitter. This type of illumination is also referred to as coaxial reflected-light illumination. In the case of the arrangement from EP 1 646 855 B1, the light passing through the spectacle lens in the coaxial reflected-light illumination used in this document is furthermore incident on a retroreflector and passes from there virtually on itself back to the camera. The light passing through the spectacle lens in the eccentric illumination, which is then effected by means of an additional light source, also passes back on itself after reflection at the retroreflector (if it impinges on this at all), but it does not reach the camera on this path owing to the eccentricity of the additional light source. At most the reflections at both spectacle lens surfaces do that. The fact of whether and where such reflections occur depends on the curvatures of the spectacle lens surfaces and on the pose of the lens during the measurement. In the case of EP 2 597 451 A2, a rotating wedge is used instead of the retroreflector.

In this way, compared with the construction in EP 1 646 855 B 1 or EP 2 597 451 A2, a position and/or orientation of the spectacle lens can be determined with a simple extension, namely the provision of one or more additional light sources for the eccentric illumination.

The position and/or orientation can then be determined on the basis of comparatively simple optical considerations that take account of the light refraction by the spectacle lens.

In some exemplary embodiments, in particular in accordance with the first aspect of the disclosure, but not restricted thereto, the apparent location of the permanent marks can differ from the real location of the permanent marks on account of light refraction by the spectacle lens.

This has the advantage that determining the apparent location of the permanent marks—in contrast to determining the real location—can also yield information concerning the refraction properties of the spectacle lens. In addition, it may thus be possible to measure a spectacle lens from a different side than the side on which the permanent marks are applied. This yields more design options for the holders.

In some exemplary embodiments, in particular in accordance with the first aspect of the disclosure, but not restricted thereto, the holder can be composed of an opaque material.

In some exemplary embodiments, in particular in accordance with the first aspect of the disclosure, but not restricted thereto, the holder can be a suction holder.

This has the advantage that rapid and gentle mounting and exchange of the spectacle lens can be made possible, with the result that the time required for carrying out the method can be reduced compared with other types of mounting.

This can also have the advantage that a larger number of materials are available for the construction of the holder, with the result that the desired properties, for example the mechanical properties, of the holder can be improved.

Typically, eccentrically illuminating the spectacle lens is carried out by means of a plurality of light sources, which results in a plurality of reflections (or else a plurality of pairs of reflections in the case of reflections from the front side of the spectacle lens and the back side of the spectacle lens). The accuracy of the determination can be increased by the use of a plurality of light sources.

In order to extend the range of measurable spectacle lenses (characterized by the curvatures of the front side of the spectacle lens and the back side of the spectacle lens) and to further increase the accuracy of the determination of the position and/or orientation, the plurality of light sources can be located at different distances from the optical axis of the camera unit. The curvatures are defined as reciprocals of the principal radii of curvature as in differential geometry; see e.g., Bronstein-Semendjajew, Taschenbuch der Mathematik [Handbook of Mathematics], 25th edition 1991, chapter 4.3. The process of eccentrically illuminating is thus carried out here by means of a plurality of light sources that result in a plurality of reflections in particular at the front side of the spectacle lens, the location of which is detected by the latter being measured in a recorded image.

In this case, the plurality of light sources can be activated alternately, e.g., individually or in groups successively, and the corresponding reflections can be detected successively. In this way, each reflection can be assigned to the respective light source, which facilitates the calculation because it precludes errors owing to an incorrect assignment of reflections. The location of the plurality of light sources and likewise the location of the camera unit are known in the world coordinate system and influence the calculations for determining position and/or orientation.

If the groups are chosen suitably, an alternate activation in groups can have the effect that detecting the location of the at least one reflection (here a plurality of reflections) has to be carried out fewer times than the number of light sources present, in order to be able to assign each reflection unambiguously to the respective light source. One example of such a procedure is presented in the following table:

TABLE

| Detection | Light source | | | | | | |
| | #1 | #2 | #3 | #4 | #5 | #6 | #7 |
| --- | --- | --- | --- | --- | --- | --- | --- |
| #1 | 1 | 0 | 1 | 0 | 1 | 0 | 1 |
| #2 | 0 | 1 | 1 | 0 | 0 | 1 | 1 |
| #3 | 0 | 0 | 0 | 1 | 1 | 1 | 1 |

Here, therefore, for 7 light sources #1-#7, detecting the location of the reflections is carried out three times (detection #1-#3), wherein in each case the light sources identified by "1" are switched on and the light sources identified by "0" are switched off. Reflections or reflection pairs caused by the light source have the same behavior as the light source, i.e., they are present when the light source is switched on, and absent when the light source is switched off. If this behavior is written as a binary number, wherein a 1 corresponds to a present reflection and a 0 corresponds to an absent reflection (e.g., 011 if the reflection is absent in detection #1 and is present in detections #2 and #3), the assigned light source is the one which has the same binary number over the three detections in its column in the above table (the light source #4 in the example).

For each light source used, in the general case, the process of eccentrically illuminating brings about two reflections on the spectacle lens: one on the front side and one on the back side. It can also happen that one or both of these reflections do(es) not occur on the spectacle lens, e.g., because the spectacle lens is too small or is tilted to an excessively great extent. In the case of the reflection at the back side, the refraction of the light occurs both at the entrance point and at the exit point at the front side of the spectacle lens. In the case of a back side reflection, the reflection phenomenon apparently lies at the exit point after the reflection at the back side. How close together the front side and back side reflections are depends on the radii of curvature of the spectacle lens: If they are very similar, both reflections are in each case close together, otherwise they are also far apart from one another or one of the two reflections does not occur because it would lie outside the spectacle lens. If front and back side reflections are close together, however, the spectacle lens also has a low power and then the distinction between the two reflections no longer matters as much. For each assumed location and orientation of the spectacle lens, it is possible to calculate the location of the reflection images in the camera image (or in the case of a plurality of cameras: in the plurality of camera images) by ray tracing.

The calculation of the position and/or orientation is typically performed iteratively and, as already mentioned, can be carried out by other steps, for example eccentrically illuminating and detecting the location of the at least one reflection. A start value for the orientation and position of the spectacle lens is taken as a beginning. By way of example, the start value taken as a basis can be no tilting about the x- and y-axes, mounting exactly in the center of the spectacle lens and rotation about the z-axis, which results from the detected apparent location of the permanent marks. For each pose that occurs in a following iteration, the expected apparent location of the permanent marks and also expected locations of the at least one reflection have been calculated. In this case, expected locations are locations which result for specific values of position and orientation by calculation. A value for a rotation of the spectacle lens and also the offset can then be calculated by comparison between the expected location and the detected apparent location of the permanent marks and of the at least one reflection. For this purpose, it is possible to assume small changes (variation) of the position and orientation of the spectacle lens and to calculate for them what effects that then has on the expected apparent location of the permanent marks and of the at least one reflection. This is also referred to as the calculus of variations, see, for example, the German Wikipedia article "Variationsrechnung" [calculus of variations] as of Jul. 14, 2017. The procedure then involves systematically varying in the calculation the position and orientation, e.g., displacement of the ERP in three directions x, y, and z and also three spatial rotations (e.g., expressed by Euler angles or about coordinate axes of the world coordinate system), until the deviations between the thus calculated and the detected locations of permanent marks and optionally reflections are minimal. Mathematically, for this purpose it is possible to numerically solve a minimization problem, for example, in which, e.g., the sums of (weighted) squared deviations of the calculated locations of the images of the mark points and of the additional reflections from the corresponding locations of these measured determination parameters are minimized. There is a multiplicity of possible procedures for solving such minimization problems. Some possibilities are described in Press et al., Numerical Recipes, Second Edition (1992). If the weighted sum of the squared deviations, as explained in the book "Numerical Recipes", or the changes thereof between the individual iterations fall(s) below a predefined threshold, the method is ended and the result attained indicates the position and orientation of the spectacle lens with the accuracy determined by the threshold.

In some exemplary embodiments, in particular in accordance with the sixth aspect of the disclosure, but not restricted thereto, determining the position and/or orientation of the spectacle lens can comprise an iterative calculation of the position and/or orientation of the spectacle lens.

With such an iterative calculation, it is possible to efficiently determine the pose of the spectacle lens, e.g., as the position of the ERP and tilting and rotation about the axes of the world coordinate system.

In addition or as an alternative to the abovementioned provision of a plurality of light sources, it is also possible to use a plurality of observation directions for detecting the location of the at least one reflection and/or the apparent location of the permanent marks, for example by a plurality of camera units being provided or a position of a single camera unit being successively altered. Instead of one camera unit with an associated beam splitter and a coaxially acting light source as in EP 1 646 855 B1, it is thus also possible to provide a plurality of such arrangements comprising camera unit and light source to ascertain the apparent location of the permanent marks by stereogrammetry by means of bundle adjustment, also referred to as block bundle adjustment. Details in this respect can be found in the German Wikipedia article "Blockbündelausgleichsrechnung" [block bundle adjustment], as of Jul. 15, 2017. In order to determine the relative locations of the camera unit, the camera units can record an object with points that are readily identifiable in recorded images in several known poses, which then constitutes a calibration of the system. Unknown poses of spectacle lenses can then be determined using this calibration. The moving retroreflector according to EP 1 646 855 B1 or a rotating prism according to another embodiment according to EP 2 597 451 A2 can act jointly for the plurality of arrangements in this case, i.e., only one unit of this type is needed for all the camera units together.

This use of a plurality of observation directions also makes it possible to increase the accuracy or the convergence rate. Each observation direction can then be assigned at least one light source for the process of eccentrically illuminating, which light sources can in turn be activated alternately, as explained above, in order to be able to assign the reflections to the light sources. However, it is also possible to use the eccentric illumination sources jointly for all cameras which can identify their reflection image on the spectacle lens.

For the process of eccentrically illuminating, it is typically possible to use a different light wavelength than in the case of an illumination for detecting the apparent location of the permanent marks. The light wavelength for the process of eccentrically illuminating is then expediently chosen such that the spectacle lens greatly absorbs its light in transmission in order that refractions from the front side of the spectacle lens can be reliably distinguished from reflections from the back side of the spectacle lens. Beyond the visible wavelength range, some antireflection coatings have an increased reflectance relative to the visible range, which fits in with this method. However, the camera unit (or in the case of a plurality of camera units: at least one) has to be sensitive to light of the light wavelength for the process of eccentrically illuminating and its optical system has to be transmissive to the light.

By contrast, detecting the apparent location of the permanent marks can use a light wavelength at which the spectacle lens has a high transmissivity (and accordingly a low reflectivity, e.g., white light) in order thus to make the permanent marks clearly visible, e.g., in the method from EP 1 646 855 B1.

In some exemplary embodiments, in particular in accordance with the second aspect of the disclosure, but not restricted thereto, detecting the location of the permanent marks is carried out with a first light wavelength and detecting the location of the at least one reflection is carried out by illumination with a second light wavelength, wherein the spectacle lens has a higher absorption for the second light wavelength than for the first light wavelength.

In some exemplary embodiments, the second wavelength can be beyond a visible wavelength range.

This can have the advantage that the first and second wavelengths can advantageously be chosen as described above in order to have desired transmissivity, absorption and/or reflection properties.

In one typical exemplary embodiment, the mark-independent additional information additionally or alternative comprises holding characteristics of the holder. Given a known holder (e.g., suction holder) and a known shape of the spectacle lens, the position and/or orientation of the spectacle lens can be at least estimated, that is to say the holder has holding characteristics which result in a specific position and/or orientation of the spectacle lens. These holding characteristics can be calculated by a finite element method (see, for example, the German Wikipedia article "Finite-Elemente-Methode [finite element method]," as at Jun. 27, 2017) in order to calculate holding orientations. For simplification, it is also possible to use a method in which any holding orientation, i.e., the spatial angle between the surface normals at the center point of the holder (for example suction holder) and the holding direction (axis of symmetry of the holder, e.g., suction holder), is tabulated for simple ruled surfaces, e.g., for spherical and toric surfaces. In addition, the way in which the suction characteristic of the surface changes when additional moments act on the spectacle lens is calculated and tabulated beforehand. For toric surfaces, it is possible to interpolate between predicted or experimentally verified holding orientations and it is possible to take account of additional moments that arise on account of the centroid location of the spectacle lens if it were held by suction at a position assumed in the respective calculation.

With a finite element (FE) calculation, it is thus possible to calculate holding characteristics of a holder, such as a suction holder: this is a contact problem with large deformations and possibly moreover nonlinear material properties, that is to say is not in the category of simple FE problems. Such calculations require, in the case of a suction holder, the material constants of the suction holder, the suction pressure, the sliding behavior of the materials coming into contact (spectacle lens and suction holder), and also the shape of the contact area, etc. However, it is possible to predict the suction characteristics for a sufficiently large and sufficient closely graduated set of local substitutes surfaces and to tabulate them including their compliance vis à vis external moments in a table. Instead of the progressive surfaces themselves, for each holding point the best-fitting close predicted substitute surface is then sought, i.e., a substitute surface which according to a criterion (e.g., sum of the least squares) deviates the least from the actual surface, e.g., progressive surface, e.g., in an annular region corresponding approximately to the presumed contact area for many suction situations. The table shows, for each of the substitute surfaces, how the normal to the substitute surface held by suction lies relative to the holder axis, the point at which the holder axis intersects the substitute surface in the case of being held by suction, and it shows how this coordinate changes under the influence of external moments and how the angle between the holder axis and the surface normal changes under the influences of external moments. All this then makes it possible to determine by interpolation the pose of the spectacle lens held at a given or calculated holding point.

The interpolation of the holding orientation for predicted characteristic surfaces which afford a good approximation of the shape of a spectacle lens surface held by suction can also be performed with other ruled surfaces instead of toric surfaces, for example with polynomials in two dimensions, Zernike polynomials or Zernike-Tatian polynomials. Information concerning these functions can be found in Bernd Dörband, Analyse optischer Systeme [Analysis of optical systems] (Dissertation, Stuttgart), chapters 4.3.1 and 4.3.2 (1986), and in B. Dörband, H. Müller, H. Gross, Handbook of Optical Systems Volume 5, chapter 47.8 (2012).

Selected polynomials can also be, for example, normal polynomials in two variables $$f(x, y) = \sum_{i,j=0}^{n} a_{ij} * (x - x_m)^i * (y - y_m)^j$$

with an appropriate upper limit n. xm and ym denote the center point of the spectacle lens, aij are coefficients, and n is an upper limit.

One typical possibility is to approximate the spectacle lens surface locally by a torus which, at the point of contact with the holder, tangentially touches the spectacle lens with the equator of the torus and has (at the equator) exactly the same principal curvatures as the spectacle lens. These designations for toric surfaces are explained e.g., on page 24 et seq. in "Handbuch der Augenoptik" already cited. These tori are expediently identified by their "sagittal heights" along the principal meridians for a given base length, e.g., 20 mm or 30 mm. This then results in a two-parameter interpolation table for the suction characteristic, which primarily yields the angle between normal vector on the spectacle lens and axis of the holder. Preference is additionally also given to ascertaining the extent to which the holder, in particular suction holder, yields if, owing to the weight force, for example, additional moments act on the spectacle lens arranged, in particular held by suction, on the holder. This is typically carried out for a plurality of directions because the holding characteristic can depend on the surface shape. The weight force and the additional moments also have a small influence on the location of the point of intersection between the holder axis and the torus surface under consideration.

The abovementioned normal vectors of the lens held can be tabulated for appropriately graduated values in order to be able to interpolate therein. The graduation is expediently chosen such that it covers all customary spectacle lens surfaces in a small environment of all possible holder positions so well that the holding orientations in a concrete case are determinable accurately enough by interpolations. The expedient graduation can also depend on the type of substitute surfaces used, e.g., tori. The tabulated forms have to be calculated here only for one direction of the orientation, not for all possible directions, e.g., for the meridional section of the torus along the y-axis, such that the smaller curvature occurs in this section. The holding orientations precalculated in this way yield the direction of the surface normals in the state held by suction. For a surface which fits the precalculated model only in a manner rotated at the holding point (in this case, the holding point is the point of intersection between the axis of the holder and the spectacle lens) because its principal normal sections (defined as in differential geometry, Bronstein-Semendjajew, Taschenbuch der Mathematik, 21st edition, chapter 4.3) do not lie as in the case of the tabulated substituted surfaces, the moments occurring as a result of the weight force are first transformed into a local coordinate system, like that of the substitute surface in which the holding characteristic is tabulated, then the direction there between the surface normal vector and the holder in the tabulated position is calculated and the result is transformed back into the world coordinate system.

In the case of non-spherical and non-toric surfaces, the surface touched during suction is thus substituted in the calculation, locally around the suction point to be taken into account in each case, by a toric surface which, in an environment corresponding to the suction holder edge, fits the spectacle lens surface in the best possible manner, for example has a minimum distance from the precalculated toric substitute surface in terms of the root mean square over the contact area. In this case, a local rotation may also still be necessary in order that it can still be assumed for the local substitute surfaces that the curvature e.g., along the y-axis is the smaller curvature.

If the spectacle lens is then held at such a point, in most cases its center of gravity then does not lie centrally below or above the holding point. As a result of the gravitational force, a combination of moments resulting from the relative location of the center of gravity and the weight of the spectacle lens then acts as well. With the aid of tabulated influences of additional moments ascertained experimentally or by finite element calculations, it is then possible to determine the additional tilting owing to the gravitational force as interpolation. The holding orientation thus ascertained can be used for example as a start value for the orientation in the iterative methods mentioned above, which then converges rapidly because a relatively apt start value for the method can already be predefined with the precalculated orientation. Such a calculation by way of the holding characteristic is also performed correspondingly in each further iteration step.

These holding characteristics of the suction holder alone or else in combination with the location of the at least one reflection can be used as mark-independent additional information. If the accuracy of a determination only on the basis of the holding characteristics and the detected apparent location of the permanent marks is sufficient, further mark-independent additional information can be dispensed with. In this case, it is possible to carry out an iterative optimization, in a manner similar to that as described above for the at least one reflection, on the basis of the holding characteristic and the detected apparent locations of the permanent marks. The accuracy here depends on the accurate knowledge of the mechanical material properties of the holder, e.g., suction holder.

In some exemplary embodiments, in particular in accordance with the sixth aspect of the disclosure, but not restricted thereto, the iterative calculation can be carried out on the basis of a holding characteristic and the detected apparent locations of the permanent marks.

This has the advantage that the accuracy of the method can be improved further by the knowledge of the holding characteristic.

A change in the material properties e.g., as a result of aging can impair the accuracy.

Therefore, it is typical to combine the holding characteristic with the at least one reflection detected because in this combination the at least one reflection reacts very sensitively to tiltings and thus clearly provides information about the size and direction thereof. Moreover, it safeguards the method against the error influences of properties of the holder that change over time.

Therefore, in some exemplary embodiments, in particular in accordance with the sixth aspect of the disclosure, but not restricted thereto, the iterative calculation can furthermore be carried out on the basis of at least one detected reflection.

In this case, the location of the reflections of the eccentric illumination do not have to be determined statically e.g., in the state held by suction on a suction holder, rather it is also possible to determine the change in location during the introduction of the spectacle lens, for example during the holding by suction by the suction holder. For this purpose, typically, detecting the apparent location of the permanent marks and of the reflections is carried out repeatedly during the holding by suction. As a result, it is also possible to characterize the process of holding by suction or generally the process of introducing the spectacle lens into or onto the holder.

In some exemplary embodiments, in particular in accordance with the fifth aspect of the disclosure, but not restricted thereto, as described above, detecting the apparent location of the at least one reflection on the spectacle lens could comprise detecting repeatedly during a movement of the spectacle lens.

In some typical exemplary embodiments, the movement of the spectacle lens can be brought about by a process of attaching a suction holder by suction and the mark-independent additional information can comprise a characterization of the process of attachment by suction on the holder.

This has the advantage that the movement of the spectacle lens during the process of attachment by suction on the suction holder is used to determine the location of the spectacle lens. This can be advantageous particularly if the apparent location of permanent marks is detected on the side facing away from the detection system, that is to say that the apparent location is influenced by refraction at the spectacle lens, as described above. In this case, the location of the spectacle lens can be determined more accurately by means of the data which are obtained during the movement and by means of the known characteristic of the process of attachment by suction.

In some exemplary embodiments, in particular in accordance with the sixth aspect of the disclosure, but not restricted thereto, the iterative calculation can comprise in respective iteration steps a comparison between an expected location of the spectacle lens and a detected apparent location of the permanent marks and of the at least one reflection.

This has the advantage that the accuracy of the method can be improved further, as described above and below.

If there is a plurality of observation directions, it is possible, by means of a "foresight procedure," to determine the locations of both permanent marks even without the holding characteristic of the suction holder, albeit not as precisely. The spatial locations of the two permanent marks are obtained relatively well in this way. In this way, however, a tilting transversely with respect to the connecting line between the two (apparent) locations of the mark points can only be ascertained poorly, through to not being able to be ascertained at all. The additional reflections or mark-independent additional information from the holder characteristic come into play at that point: they primarily also yield the tilting of the lens about the connecting line of both (apparent) marks, as has been explained above.

The method can be used to correctly orient a stamping on the spectacle lens. In this case, determining the position and/or orientation of the spectacle lens makes it possible to carry out an accurate positioning of the stamping.

In other words, the determination of the position and/or orientation makes it possible to compensate for errors resulting from the difference between apparent location and actual location if the observation direction when detecting the apparent location does not view the optical center point of the spectacle lens in a normal manner, but rather obliquely, which results from the orientation of the spectacle lens on the holder. This occurs, as explained, particularly if the spectacle lens is held by a suction holder;

if detecting the apparent location (for example by means of a camera) takes place at a finite distance and in particular a distance shorter than the 400 millimeters mentioned above; and/or the permanent mark of the spectacle lens is applied on the back side thereof, wherein detecting the apparent location is carried out from the front side of the spectacle lens.

Specifically, the apparent location of the permanent marks which appears on the front side of the spectacle lens depends on the viewing direction and, if the spectacle lens is not viewed from infinity, also on the location of the spectacle lens.

In addition, a device for determining the position and/or orientation of a spectacle lens on a holder is provided.

The device comprises a providing unit for providing a detected apparent location of permanent marks. The device can also comprise a detection unit for detecting the apparent location of the permanent marks on the spectacle lens. It is characterized by a computing unit for determining the position and/or orientation of the spectacle lens on the basis of the provided detected apparent location of the permanent marks and mark-independent additional information.

This device can determine the position and/or orientation by using the mark-independent additional information in accordance with the method already discussed.

Typically, the device comprises one or more illumination units for eccentrically illuminating the spectacle lens, wherein the detection unit is additionally configured to detect a location of at least one reflection caused by the process of eccentrically illuminating as mark-independent additional information. Typically, the device comprises a plurality of such light sources which, particularly typically, are spatially arranged at different distances from the optical axis of the detection unit for detecting the permanent marks. This configuration of the device corresponds to the above-explained methods in which at least one reflection is used as mark-independent additional information. In this case, the computing unit for determining the position and/or orientation is configured for determining the position and/or orientation of the spectacle lens on the basis of the location of the permanent marks and the location of the at least one reflection.

Alternatively or additionally, the device can use a holding characteristic of the holder, as explained in detail above for the method, as mark-independent additional information. The holding characteristic can be stored in a memory of the device or else be retrievable from a server via a communication network, such as the Internet.

Like the method correspondingly discussed above, the device enables a simple determination of the position and/or orientation of the spectacle lens, on the basis of which further steps such as applying a stamping can then be carried out.

In this case, the computing unit can be, in particular, a correspondingly programmed computer. Accordingly, provision is also made of a computer program which, when executed on a processor, controls and carries out one of the methods described above.

BRIEF DESCRIPTION OF THE DRAWINGS

The disclosure will now be described with reference to the drawings wherein.

DETAILED DESCRIPTION OF EXEMPLARY EMBODIMENTS

Exemplary embodiments of the present application are explained below.

Figure 1A:
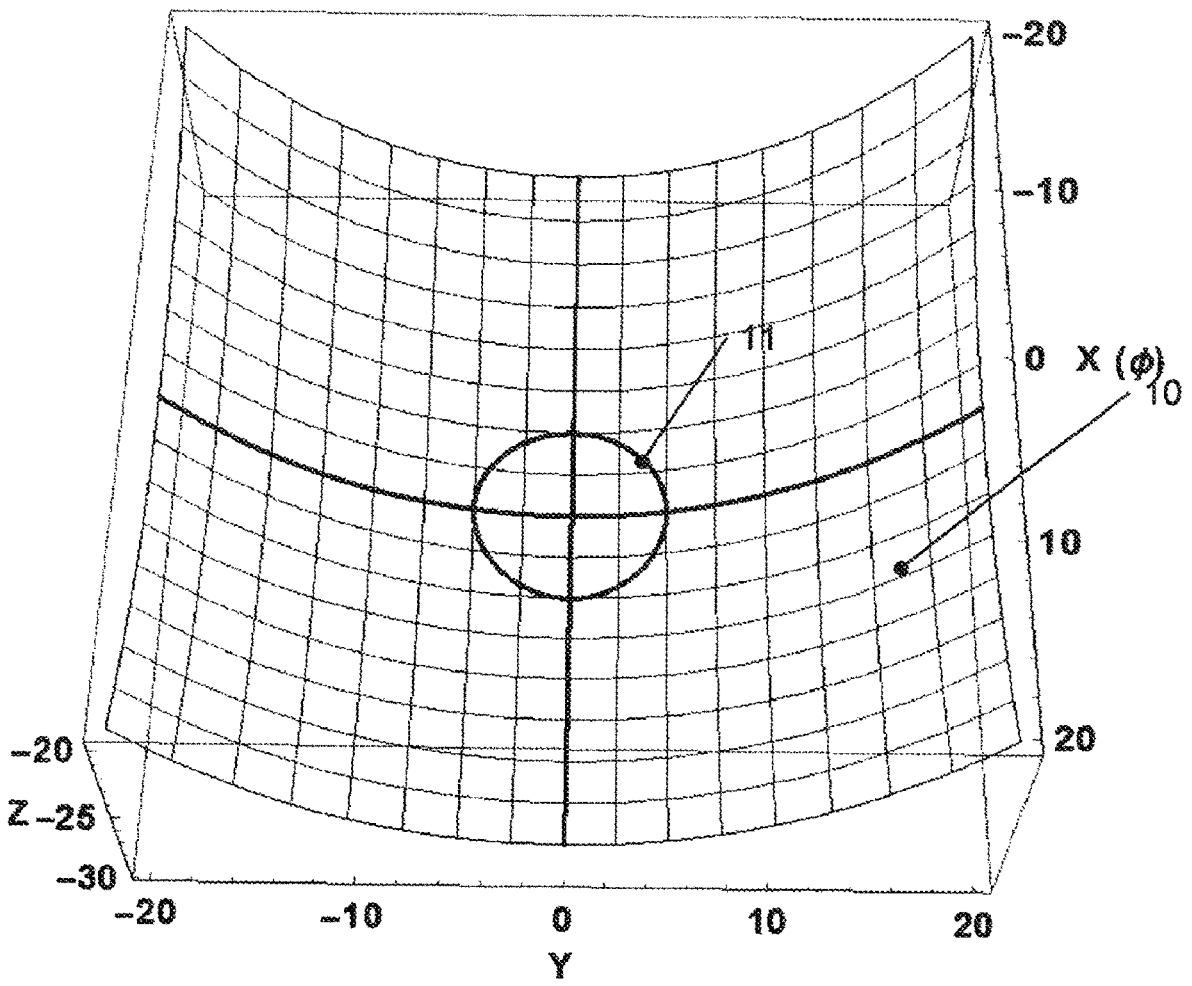
FIGS. 1A to 1D and 2A and 2B show diagrams for elucidating the processes when holding a spectacle lens on a suction holder.
Figure 1B:
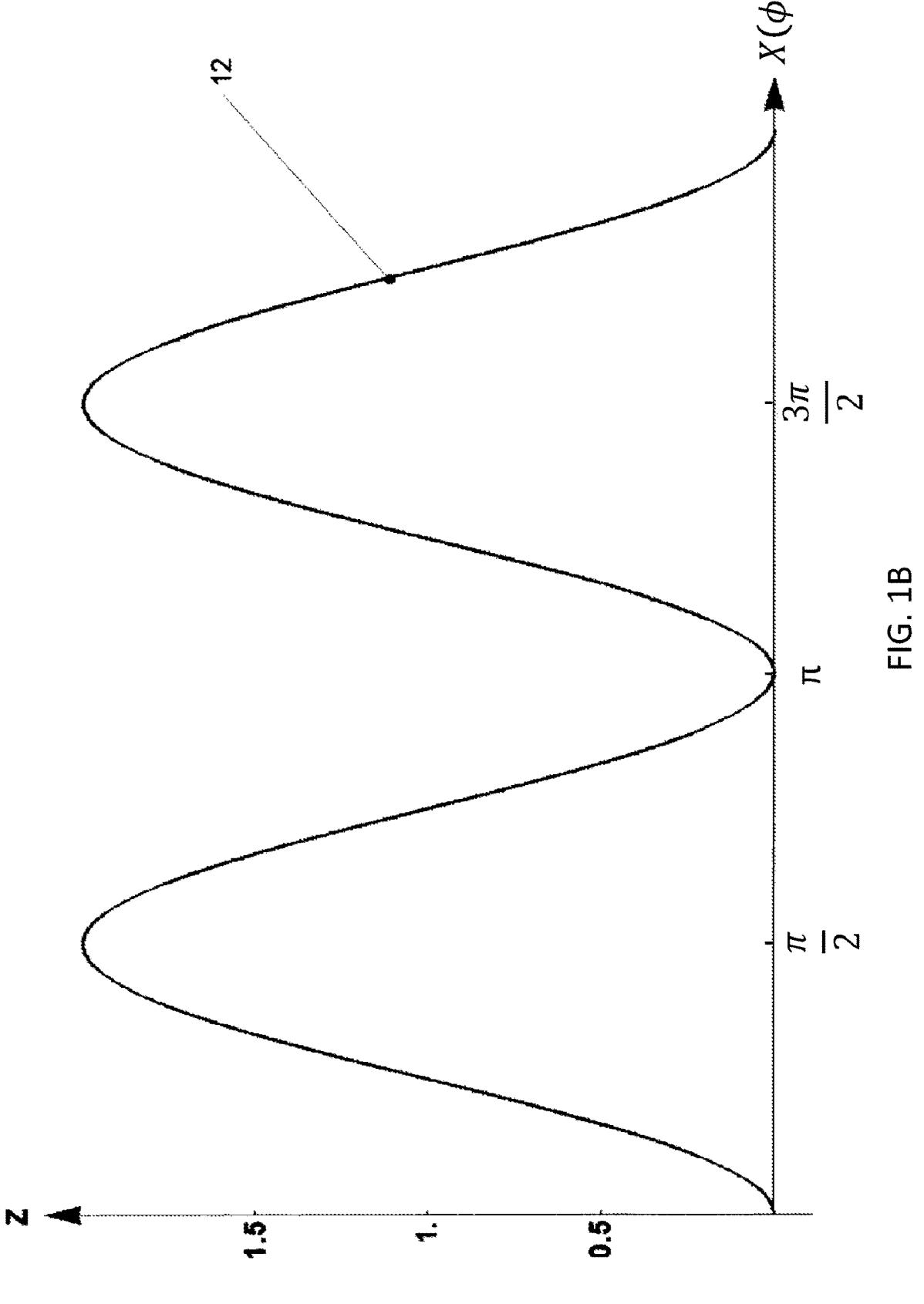
Figure 1C:
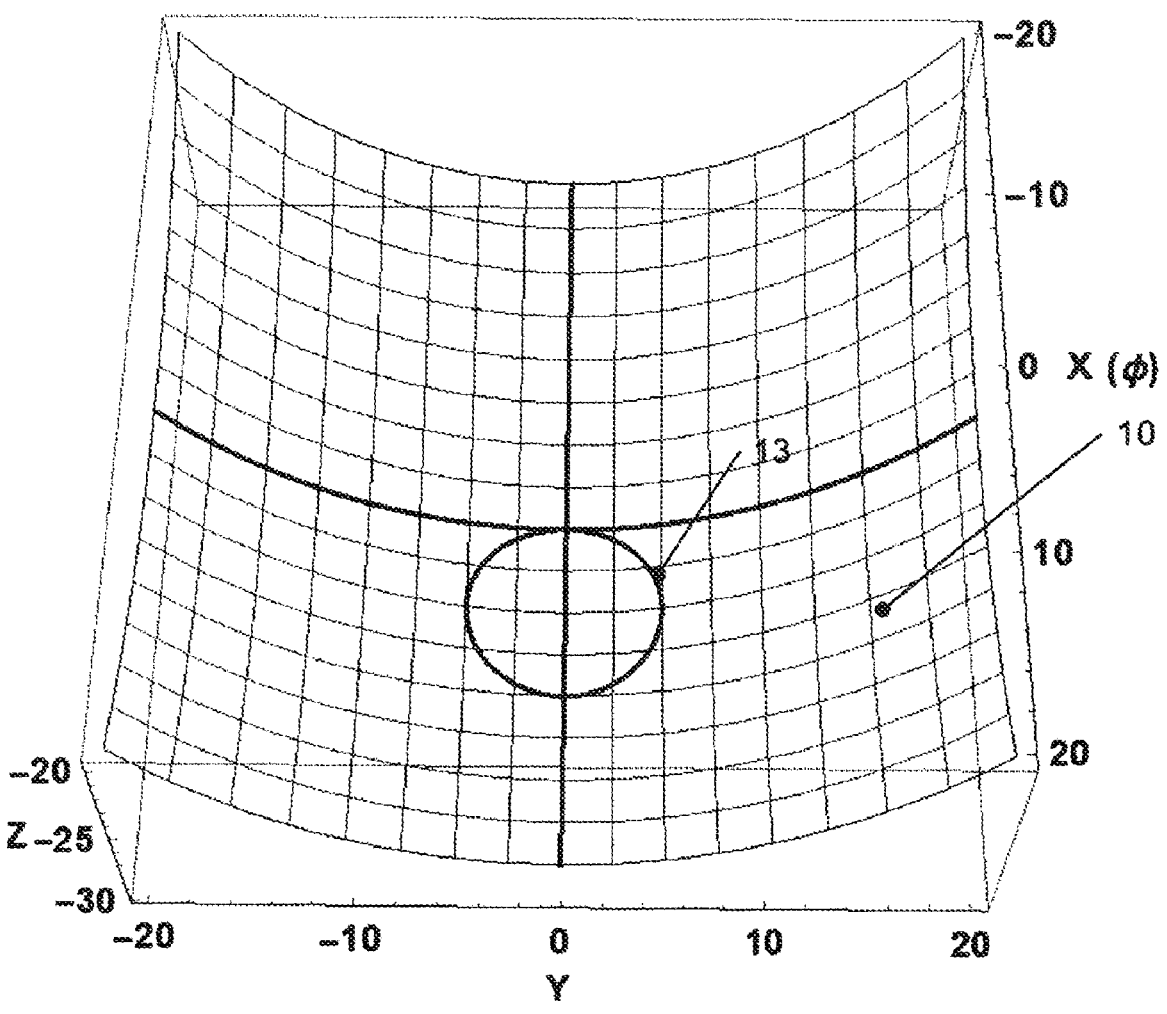
Figure 1D:
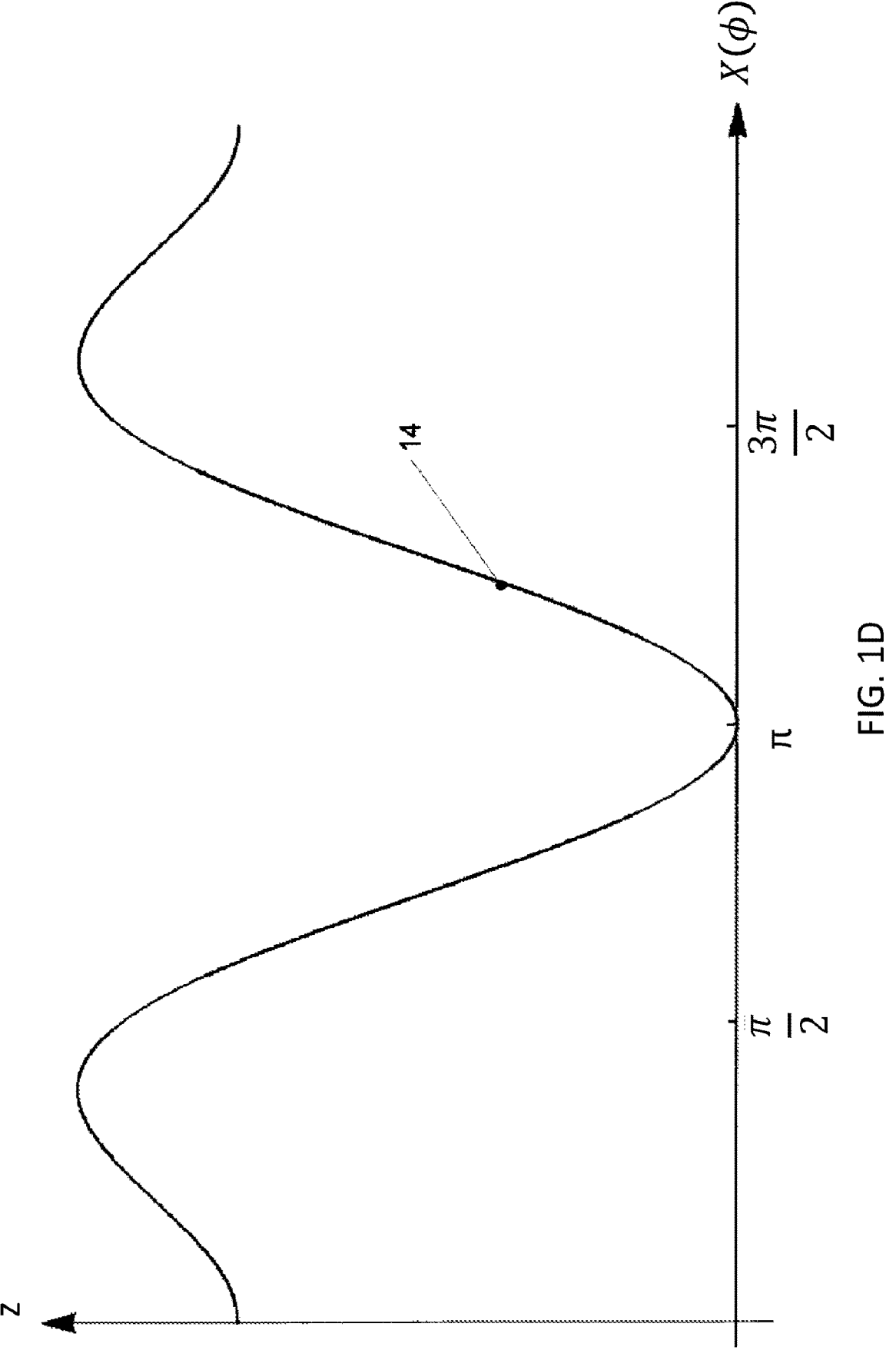
Figure 2A:
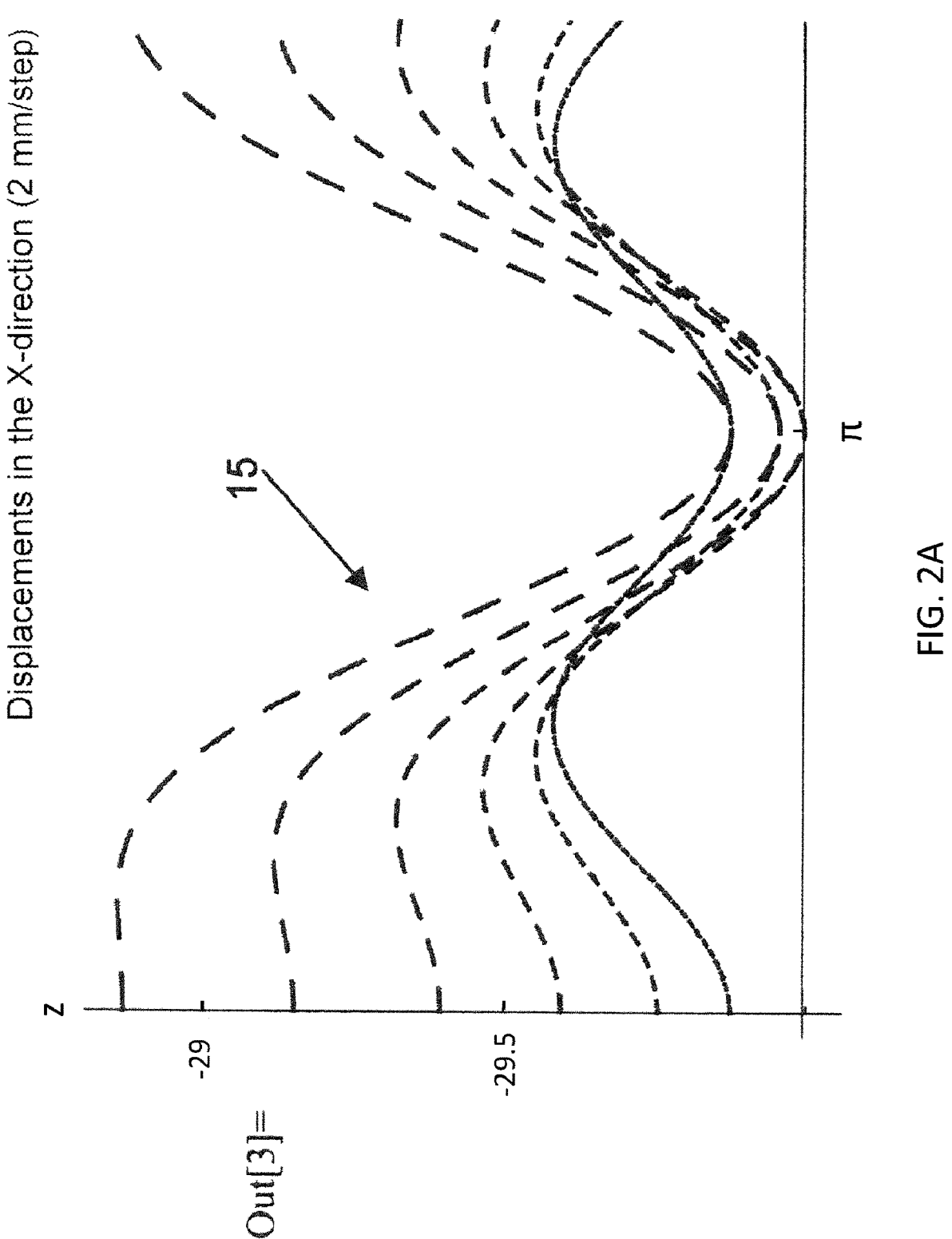
Figure 2B:
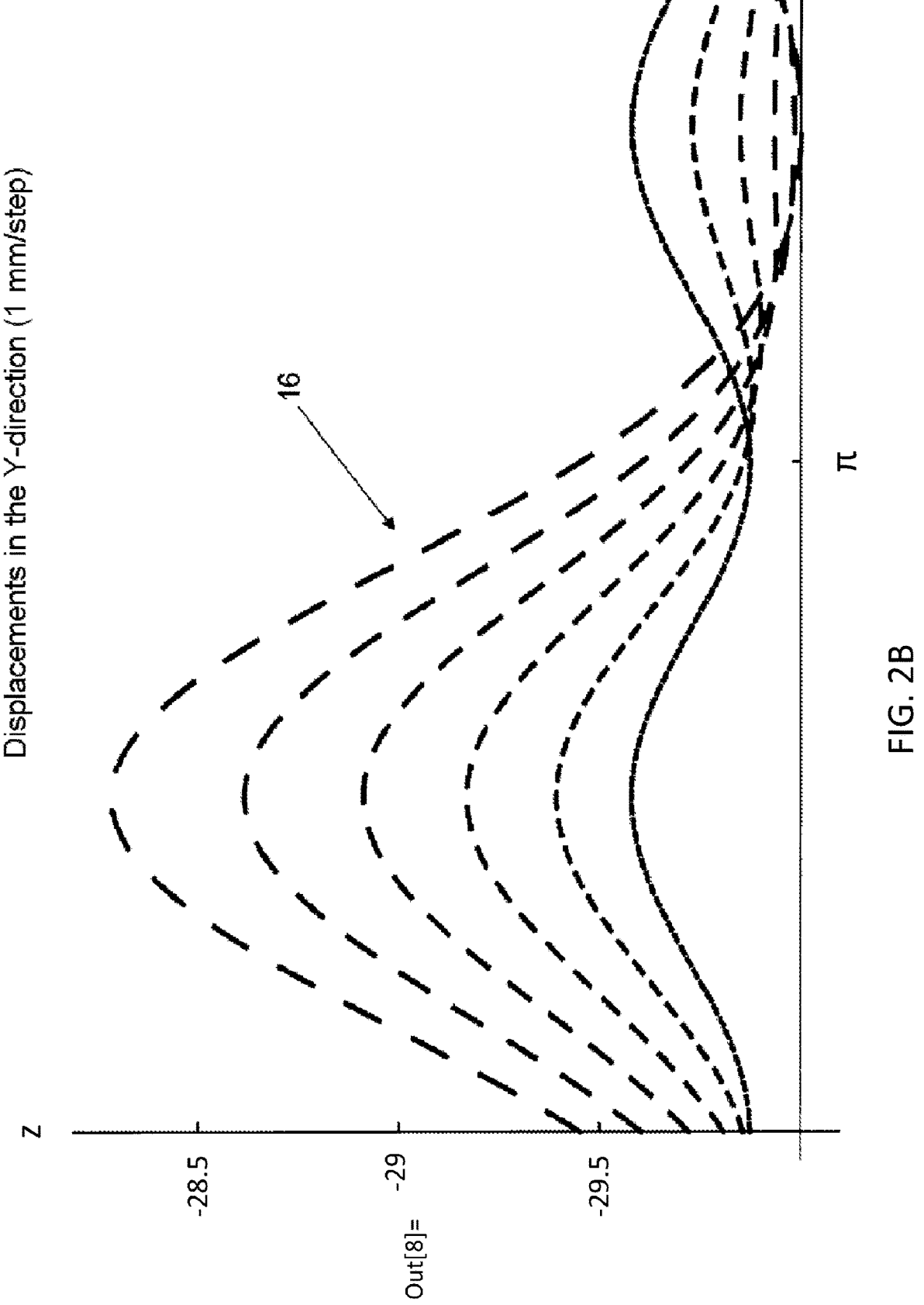
Figure 3:
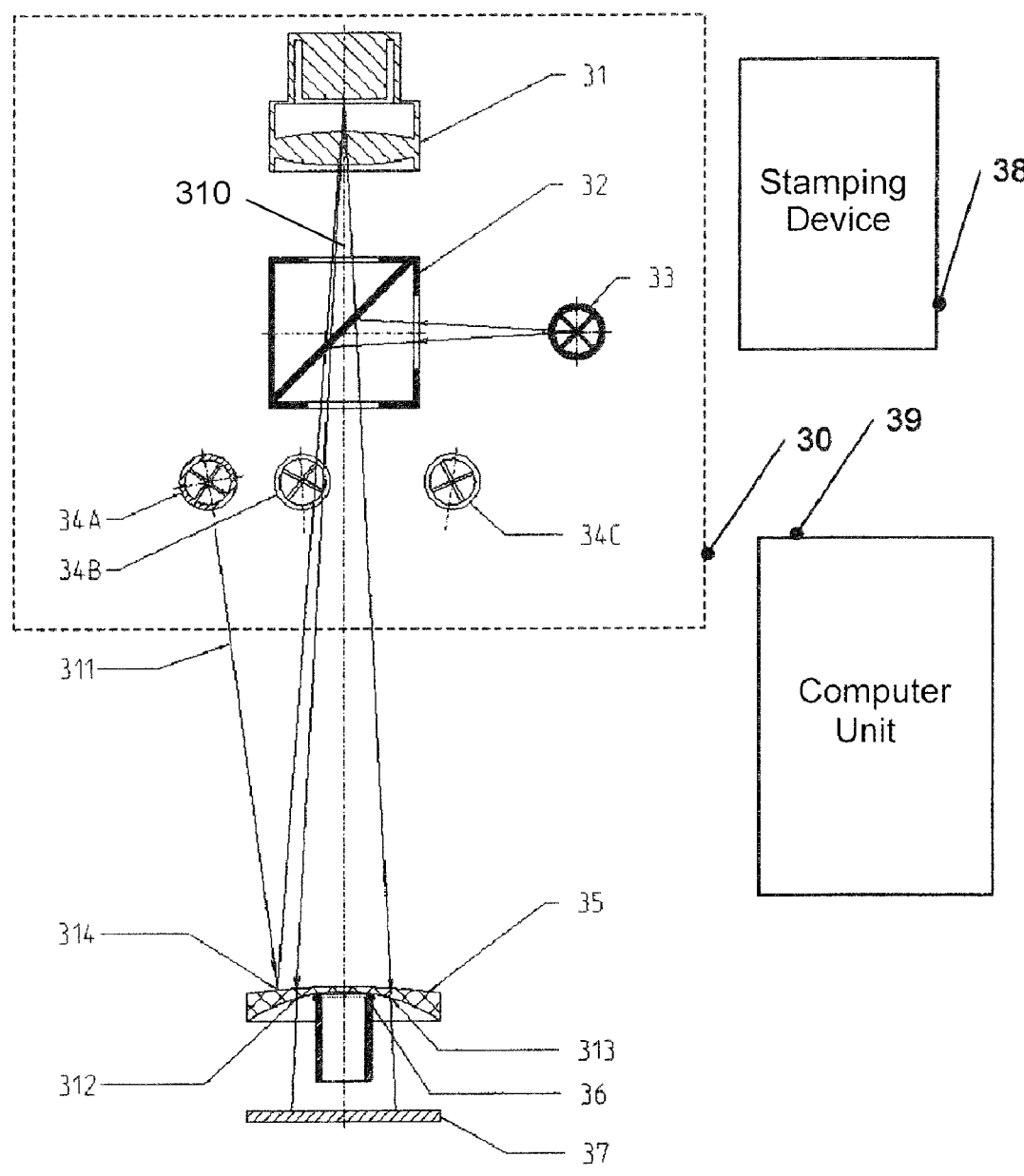
FIG. 3 shows a device for determining a position and/or orientation of a spectacle lens in accordance with one exemplary embodiment.

FIG. 3 shows a device for determining a position and orientation of a spectacle lens 35 on a suction holder 36, which holds the spectacle lens 35 by suction on the concave side of the spectacle lens. The device comprises an illumination and image recording unit 30, a retroreflector 37, and also a computing unit 39.

The illumination and image recording unit 30 comprises a camera 31, which is able to record images of the spectacle lens 35 on the suction holder 36. A light source 33 serves for illuminating the spectacle lens 35 for the purpose of determining an apparent location of permanent marks 312, 313 of the spectacle lens, which light source 33 is coupled in via a beam splitter 32 coaxially (colloquially sometimes also referred to as concentrically) with respect to an optical axis 310 of the camera 31. This illumination and the associated determination of the apparent location of permanent marks are carried out as described in EP 1 646 855 B1. In this case, light from the light source 33, which is approximately a point light source, illuminates the spectacle lens such that the light sent from the beam splitter 32 to the spectacle lens 35 apparently comes from the entrance pupil of a lens of the camera 31, i.e., is concentric with respect to the optical axis 310. This illumination, which is also referred to as coaxial reflected-light illumination, irradiates the spectacle lens 35, the location of which is intended to be determined. The light passes through the spectacle lens having the permanent marks 312 and 313, which are applied on the back side of the spectacle lens in the example depicted, is then incident on a retroreflector 37, which is movable, and then passes approximately on the same path back to the camera 31. The lens of the camera 31 then images the permanent marks with high contrast with the light that originally comes from the coaxial reflected-light illumination and has passed through the spectacle lens twice overall via the retroreflector 37.

In the case of permanent marks 312, 313 arranged on the back side of the spectacle lens 35, as described in the introduction (i.e., the side facing the holder 36), this image recording does not always take place exactly from the prescribed direction, as was explained in the introduction. Owing to the refraction of light at the front surface of the spectacle lens, that results in an apparent location of the permanent marks which differs from the real location. In the case where the spectacle lens 35 is tilted, there is a change in the apparent location of the permanent marks on the front side of the spectacle lens, which is seen by the camera 31.

This is explained with reference to FIGS. 7A to 7F. FIGS. 7A to 7F each show a spectacle lens having a spectacle lens front side 72 and a spectacle lens back side 71 and having permanent marks P1, P2 on the respective spectacle lens back side 71. Depending on the tilting of the spectacle lens on the holder (not depicted) and the shape of the spectacle lens front side 72 and the spectacle lens back side 71, the camera 31 identifies the permanent marks on the respective spectacle lens front side 72 at different apparent locations V1 and V2. The apparent locations V1 and V2 result from the actual location of the permanent marks P1, P2 in a simple manner by way of Snell's law. The drawings show in a dashed manner in each case a ray from an external light source (not depicted because it is above the excerpt shown); this could be, e.g., the light source 34A. The ERP is also depicted as a dot in each case on the front side. This reveals the extent to which the lens is decentered on the lens holder.

These drawings assume a spherical spectacle lens back side 71 and that the moments acting on the spectacle lens owing to the displacement of the center of gravity are so small that they do not influence the illustration. It is furthermore assumed that the holding point on the back side always lies at {0,0} in the drawing. If moments acted owing to the weight distribution, the holding point in FIGS. 7A and 7B and also in FIGS. 7E and 7F could move somewhat along the z-axis, that is to say to {0,zh} where zh is small. Moreover, the actual tilting could actually become somewhat greater than depicted.

In FIGS. 7A to 7F, the light rays are depicted as solid lines from the permanent marks P1 and P2 situated on the back side of the spectacle lens via the apparent positions V1 and V2 on the front side to the projection center of the camera; the projection center is again assumed to be above and outside the drawing on the z-coordinate axis.

FIGS. 7A to 7F additionally depict light rays as dotted or dashed lines which proceed from the eccentric light source 34A, which is likewise situated at the top left outside the partial drawings and is therefore not illustrated, and which satisfy the reflection condition: The dotted line shows that for a respective reflection 76 caused by reflection at the spectacle lens front side 72, and the dashed line shows that for a respective reflection 75 caused by reflection on the spectacle lens back side 71. Two light refractions occur on the dashed line progression for the reflection 75: at the location (not designated any further) where the dashed light beam enters the spectacle lens on the spectacle lens front side (designated by 73 in FIG. 7B), and at the location—designated by 75—at which the ray emerges from the lens again after reflection at the spectacle lens back side 71 at 74 (only identified separately in partial FIG. 7B). The camera 31 identifies the reflection via the back side at the location 75. It is possible to calculate the crucial points for this reflection, e.g., by applying the law of reflection or solving twice Snell's law and implicit equations. In practice that amounts to iterative methods in each case.

Figure 7A:
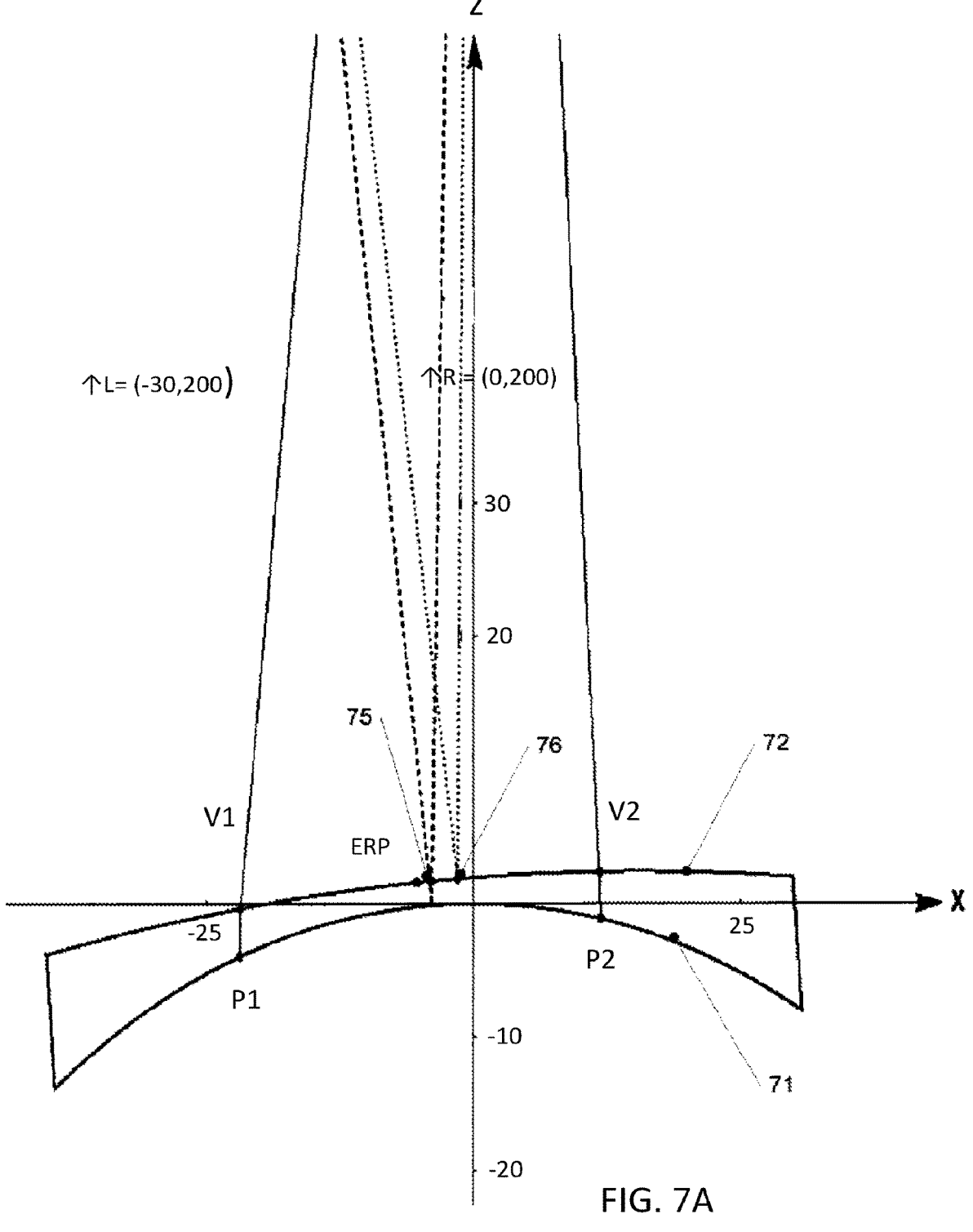
FIGS. 7A-7F show illustrations for elucidating an apparent location of permanent marks.
Figure 7B:
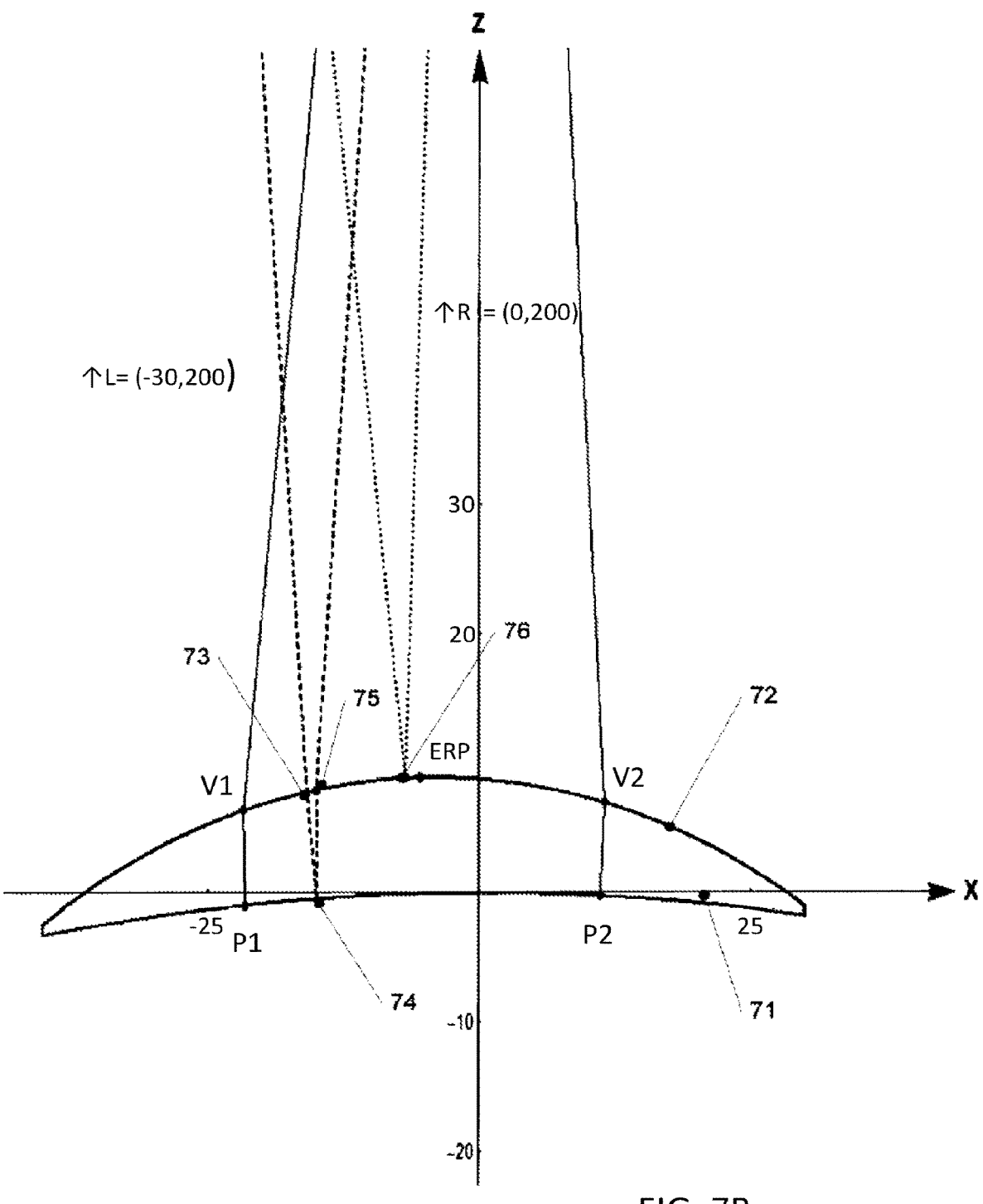
Figure 7C:
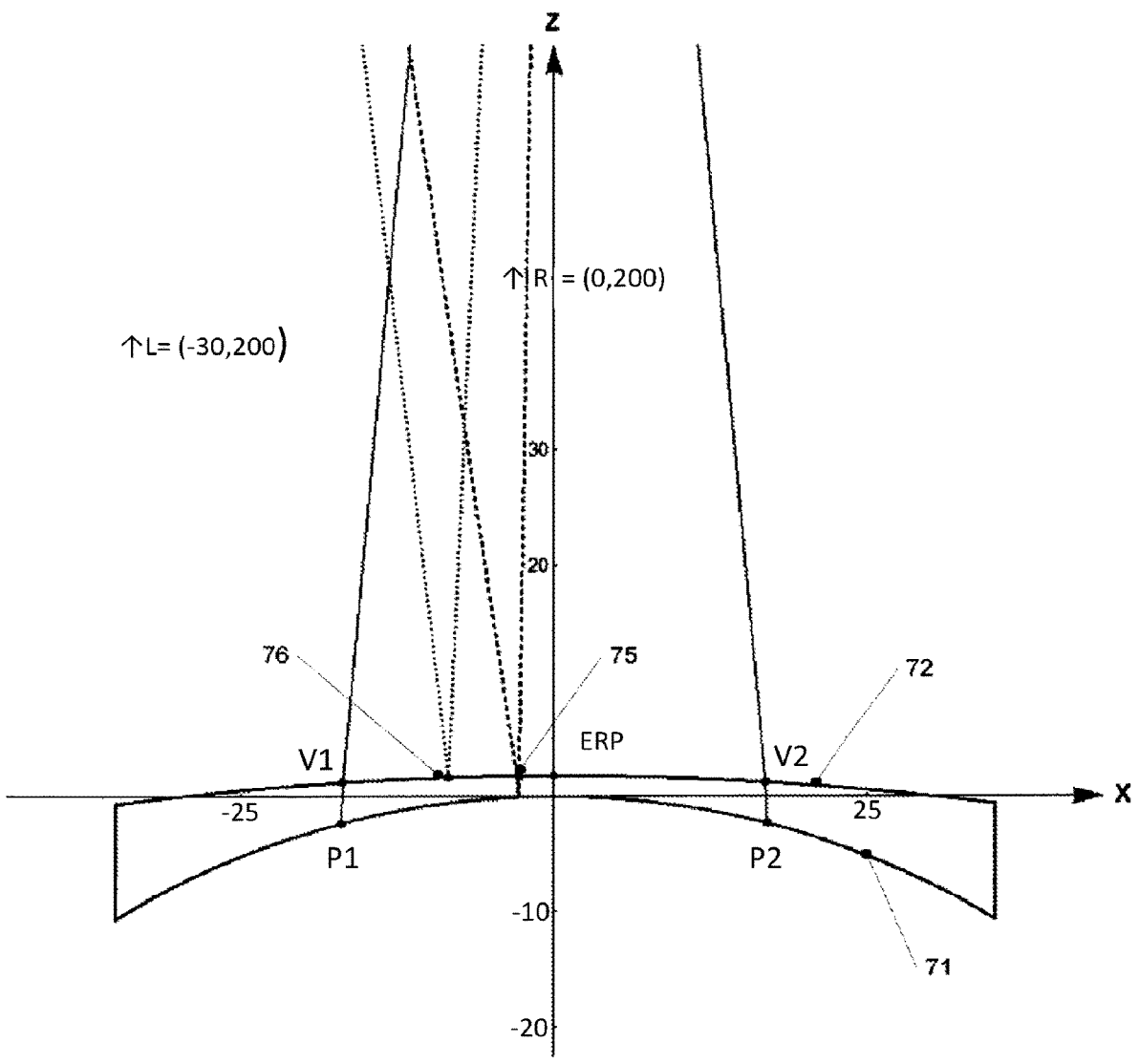
Figure 7D:
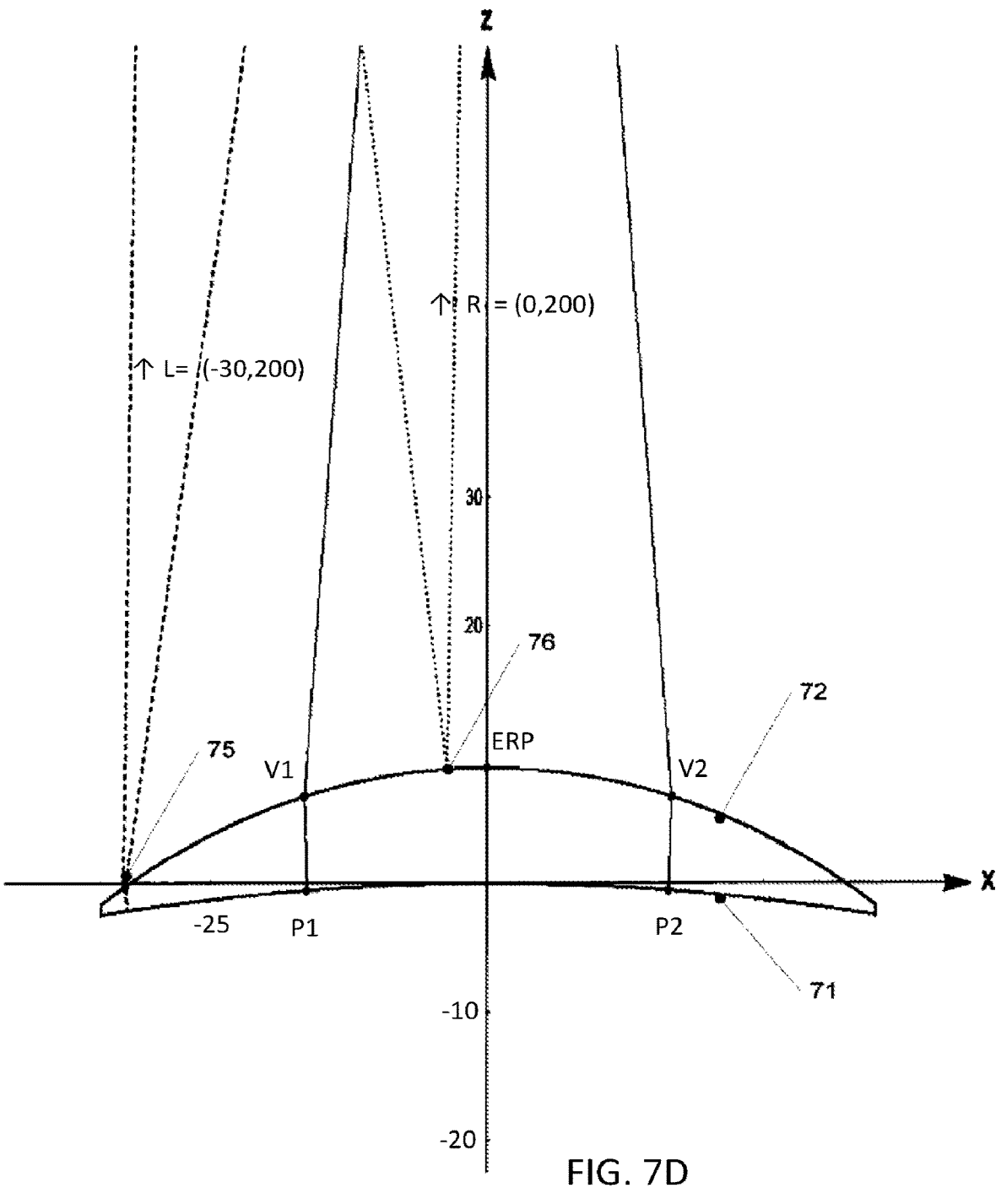
Figure 7E:
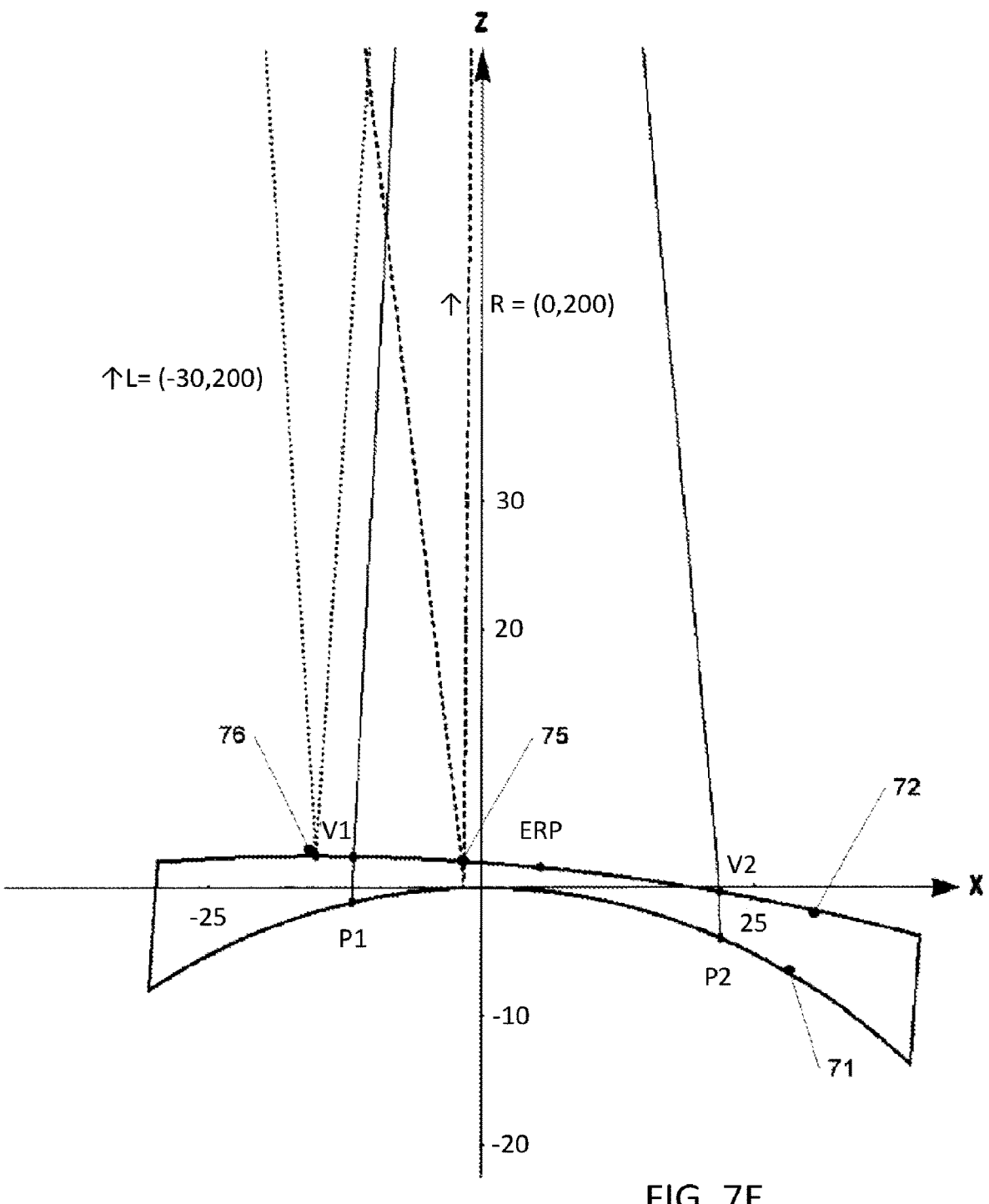
Figure 7F:
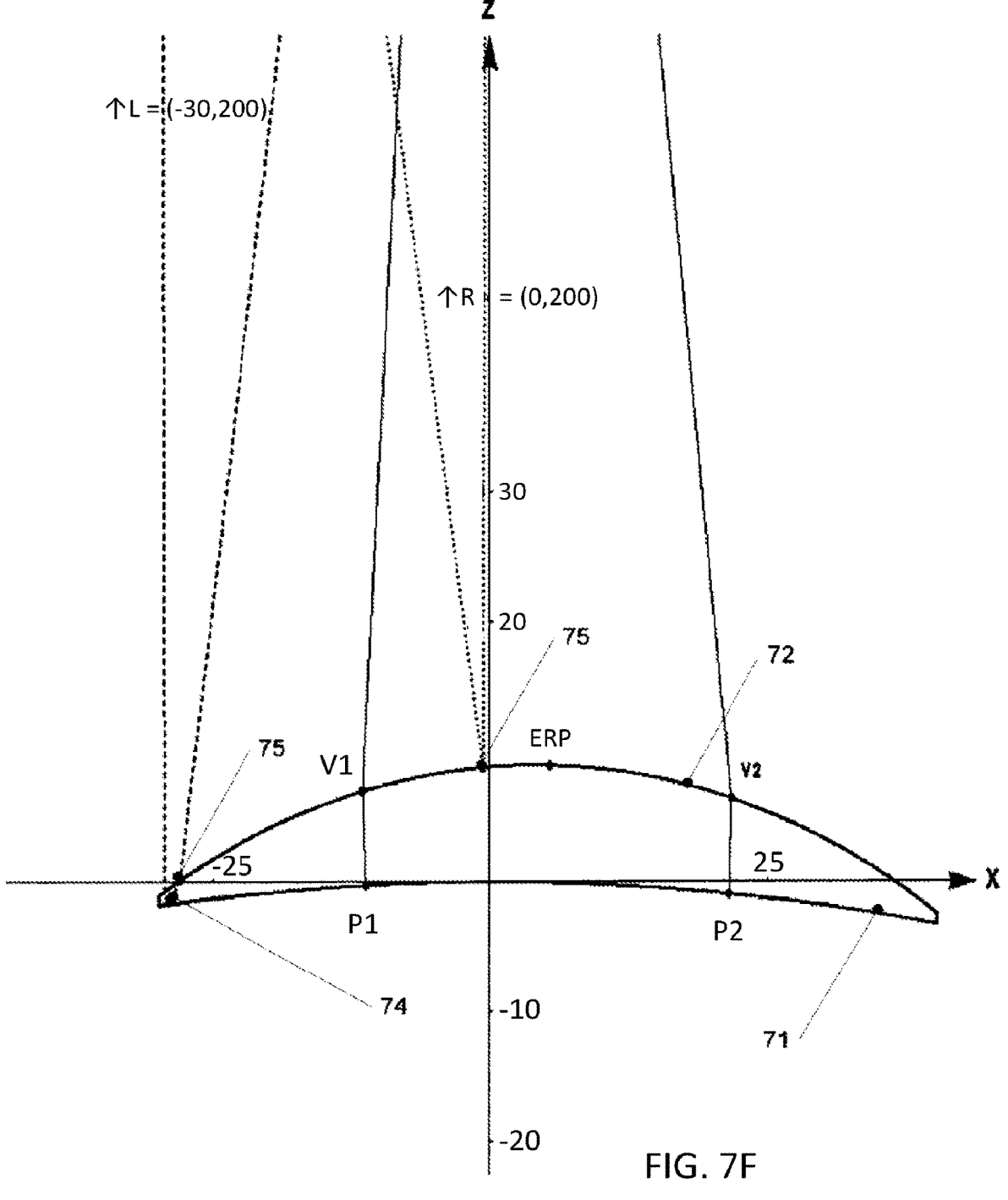

Partial FIGS. 7A and 7B show a decentration and tilting toward the left that is caused thereby, partial FIGS. 7C and 7D show an "ideal" positioning and partial FIGS. 7E and 7F show a corresponding decentration and tilting toward the right. It is evident that the apparent locations of the permanent marks, roughly speaking, are displaced in a manner similar to, but not exactly the same as, the ERP (not able to be recognized directly by the camera), but the light reflections are displaced to a greater extent. Primarily the reflection at the surface that is curved to a lesser extent, that is to say that of the spectacle lens back side 71 in the partial drawings with the spectacle lens having a positive refractive power, that is to say that of the spectacle lens front side 72 in the drawings with the spectacle lens having a negative refractive power, reacts comparatively strongly to the tilting caused by the decentration. The situation would be just the same if only a tilting without the decentration were effective: The reflections react relatively sensitively thereto, while the points V1 and V2 are then influenced only by a cosine effect (i.e., an effect dependent on the cosine of the tilting angle), that is to say only comparatively little. The reflections therefore offer effective mark-independent additional information for accurately determining the pose of the spectacle lens, as is necessary for a stamping with an accurate fit.

In order to determine the position and orientation of the spectacle lens 35, the exemplary embodiment in FIG. 3 contains additional light sources 34A, 34B and 34C, the reflections of which are determined in a camera image recorded by the camera 31. A light path for such a reflection at the upper spectacle lens surface in the drawing, which is seen by the camera, is designated by 311 in FIG. 3. The light passing through from the external light sources 34A to 34C passes through the spectacle lens 35 and is reflected by the retroreflector 37 approximately back again to the respective light source. It hardly disturbs the image recording by the camera 31 for the light from all light sources, including the concentric reflected-light illumination 33. Moreover, provision can be made for switching on all these light sources successively in each case only for separate camera images such that their separation and also the assignment of which reflection comes from which light source become possible easily. In the case of spectacle lenses with an antireflection coating, only weak reflections occur at the spectacle lens front side and the spectacle lens back side. However, since the camera is reached only by way of the reflection conditions, these light sources can be configured such that they are correspondingly bright.

Reflections at the spectacle lens back side can also occur besides the reflections at the spectacle lens front side. They have to be distinguished from reflections at the spectacle lens front side. That is particularly simple if a wavelength that is greatly absorbed in the spectacle lens material is provided for the light sources 34A to 34C. Reflections via the spectacle lens back side thus appear much darker than those from the front side. Their intensity is ideally below a threshold, e.g., the detection threshold. The camera 31 together with its optical system must then be sensitive to the light from the light sources 34A to 34C.

Figure 4:
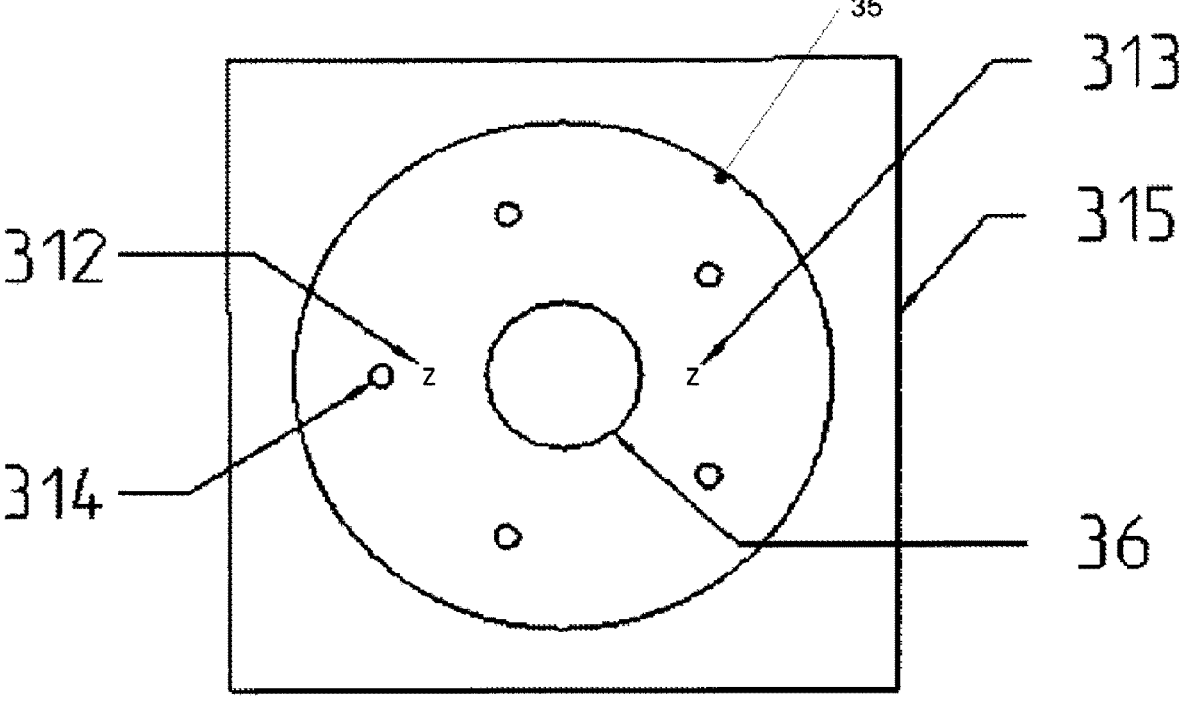
FIG. 4 shows examples of reflections in the device from FIG. 3.

[FIG. 4 shows one example of the location of front side reflection points 314 (i.e., reflections that arise as a result of reflection at the spectacle lens front side) when five light sources are used, of which three (34A to 34C) are illustrated in FIG. 4. The reference sign 315 denotes a field of view of the camera 31. In addition, back side reflection points can arise as a result of reflection at the spectacle lens back side. These points are not illustrated for the purpose of simplification in FIG. 4 and also further below in FIG. 6, but will be explained later with reference to FIG. 7.

The camera 31 can detect these reflection points if the tilting is not so great that the reflection no longer occurs at all at the spectacle lens front side or falls out of the field of view of the camera. If FIG. 7E is imagined with the tilting doubled, it is evident that the reflection 76 on the front side 72 falls off the lens. C.f. the location of the point 76 in FIGS. 7A, 7C, and 7E. The coaxial reflected-light illumination 33 likewise produces a reflection point. However, this reflection point has a comparatively low contrast because the light from the light source 33 is such that an unnecessarily large amount thereof is not absorbed by the spectacle lens material. A relatively large part of the light at this reflection point passes to the retroreflector and from there back to the camera 31. The sensitivity thereof is set such that the entire field of the spectacle lens appears "bright" as a result. It is only if the suction holder 36 lies somewhat on the optical axis 310 of the camera 31, for instance, that the retroreflector 37 is shaded by the suction holder 36, and the reflection can be visible and additionally used for determining the position and/or orientation. However, the reflection can then also be superimposed by a reflection from the spectacle lens back side or can be confused with the reflection from the spectacle lens back side. The reflections of the external light sources 34A to 34C can be evaluated better, particularly if the light therefrom is absorbed by the spectacle lens material to such a great extent that reflections from the spectacle lens front and back sides are clearly differentiable.

Without a possibility of differentiation by way of their apparent brightness, the reflections from the spectacle lens front side and the spectacle lens back side, in the case of greatly different radii, can also be differentiated by way of their size on account of the defocusing: The camera is focused such that it displays points at the distance of the permanent engravings with optimum sharpness. As a result of the reflection at a surface which, from the viewpoint of the camera, is curved in each case toward the latter, the external light source, e.g., 34A, appears even further than it actually is. That applies primarily to the reflection at the more curved surface in each case. The luminous reflection point appears somewhat more blurred as a result. However, this effect is not all that pronounced, especially because the camera lens of the camera 31 stops down greatly to obtain a large depth of field. A further distinguishing feature is the relative location: the shape of the respective spectacle lens and how the latter is constructed are known; only the pose that is intended to be determined is unknown. The computing unit 39 can calculate which of two distinguishable reflections more appropriately matches the spectacle lens front side, and which the back side. Moreover if the two reflections actually converge indistinguishably closely, this situation would not apply to the other external light sources. It is advantageous, therefore, also to provide light sources which are approximately opposite one another in relation to the optical axis of the camera 31, e.g., in a situation as in FIG. 7A with approximately $7/12$ of the depicted decentration an external light source mirrored at the optical axis with respect to the light source from FIG. 7A. The light source 34C from FIG. 3 would then yield clearly distinguishable front and back surface reflections.

In the exemplary embodiment in FIG. 3, the light sources 34A to 34C and 33, under the control of the computing unit 39, are activatable and deactivable individually or in groups, such that the reflections illustrated in FIG. 4 can be detected successively and it is possible to establish which reflection should be assigned to which light source 34A to 34C, 33.

By appropriately setting the operating point of the camera 31 (sensitivity or exposure time depending on the intensity of the light sources 33, 34A to 34C and the transmittance of the spectacle lens 35), it is possible to ensure that the brightest region in the image does not completely exhaust the sensitivity dynamic range of the camera 31, rather that the reflection of the additional light sources 34A to 34C is clearly visible simultaneously in an image recorded by the camera 31. As explained above, however, it is also possible to record a plurality of images with optionally activated light sources.

Figure 5:
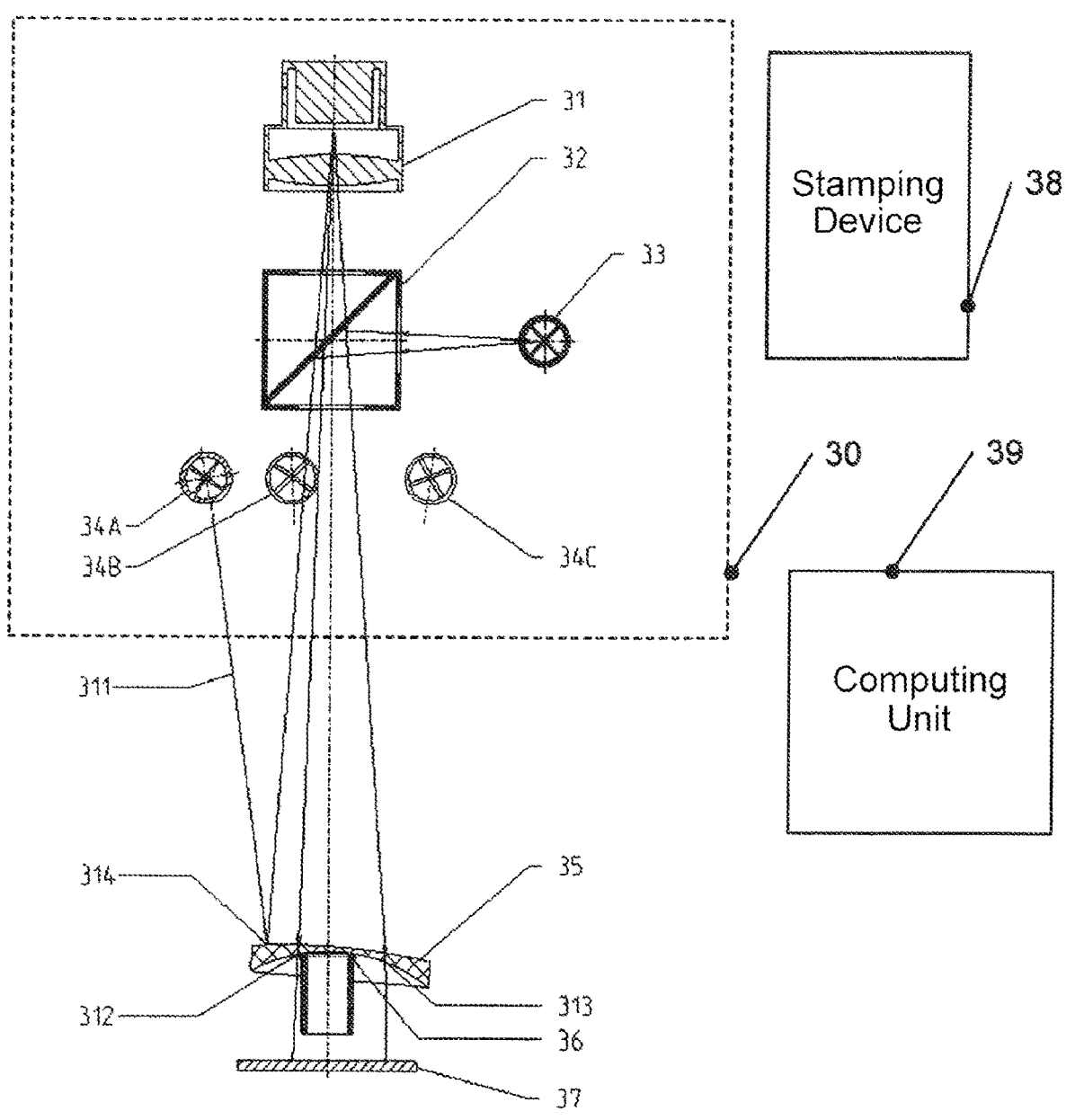
FIG. 5 shows the device from FIG. 3 with a tilted location of the spectacle lens.
Figure 6:
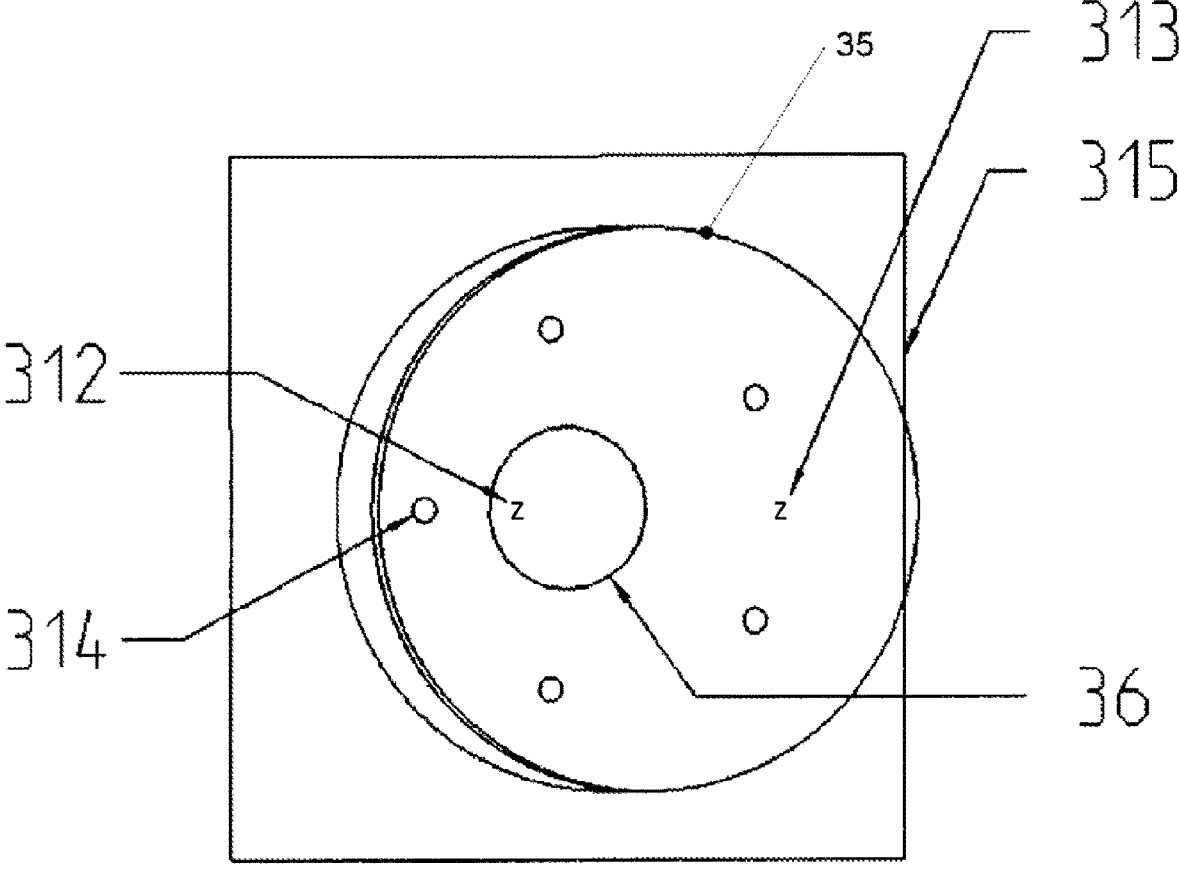
FIG. 6 shows examples of reflections in the case of the tilted location from FIG. 5.

The location of the reflections 313 in FIG. 4 is then measured to determine the position and orientation of the spectacle lens 35. This is because the location of the reflections 313 changes for example in the case of a tilting of the spectacle lens 35. FIG. 4 further reveals the apparent location of the permanent marks, identified there once again by 312 and 313. FIGS. 5 and 6 show the location of a spectacle lens which is attached to the suction holder by suction and held thereby in a laterally displaced manner. In FIG. 5, the spectacle lens 35 on the suction holder 36 is therefore in a tilted position. Accordingly, the location of the reflections 314 also changes, compared with the location of the reflections 314 in the case of FIG. 4, which corresponds to a straight orientation. The location of the permanent marks 312, 313 changes comparatively little by comparison therewith. The location of the reflections and the apparent locations of the permanent marks thus change in different ways and, as explained, this is used for determining the position and orientation of the spectacle lens. A plurality of light sources as in FIGS. 3 and 5 are assumed, which are arranged on an imaginary circle around the optical axis 310. In order to be able to measure even relatively large regions of differently curved spectacle lenses, it may be expedient to provide a plurality of imaginary circles having different diameters for these light sources or to arrange them spirally around the optical axis 310 from FIG. 3.

In the case of a spherical spectacle lens, the reflections with a circular arrangement likewise lie on an imaginary circle, as indicated in FIG. 4. Deviations from the circularity of the reflection locations arise in the case of a non-spherical shape.

In the case of a spectacle lens having a spherical spectacle lens front side, the diameter of the imaginary circle depends primarily on the radius of curvature of the spectacle lens surfaces. If the spectacle lens to be measured is ideally centered and oriented on the suction holder 36, i.e., the center point of the spectacle lens (center point between the permanent marks) lies on the optical axis 310 and the direction of the surface normal to the center point runs in the direction of the optical axis 310, then the reflection points lie on a circle around this center point in the image recorded by the camera 31, and the two permanent marks lie symmetrically with respect thereto, as illustrated in FIG. 4.

In the case of a lateral displacement or in the case of tilting of the spectacle lens, the reflections are displaced, as illustrated in FIG. 6. Like FIG. 4, FIG. 6 shows only the front surface reflections. The displacement follows the imaging law over a curved minor having the shape of the front surface of the spectacle lens. The displacement of the back surface reflections owing to a tilting follows a similar law, but in this case two refractions at the spectacle lens also take effect as well.

Figure 10:
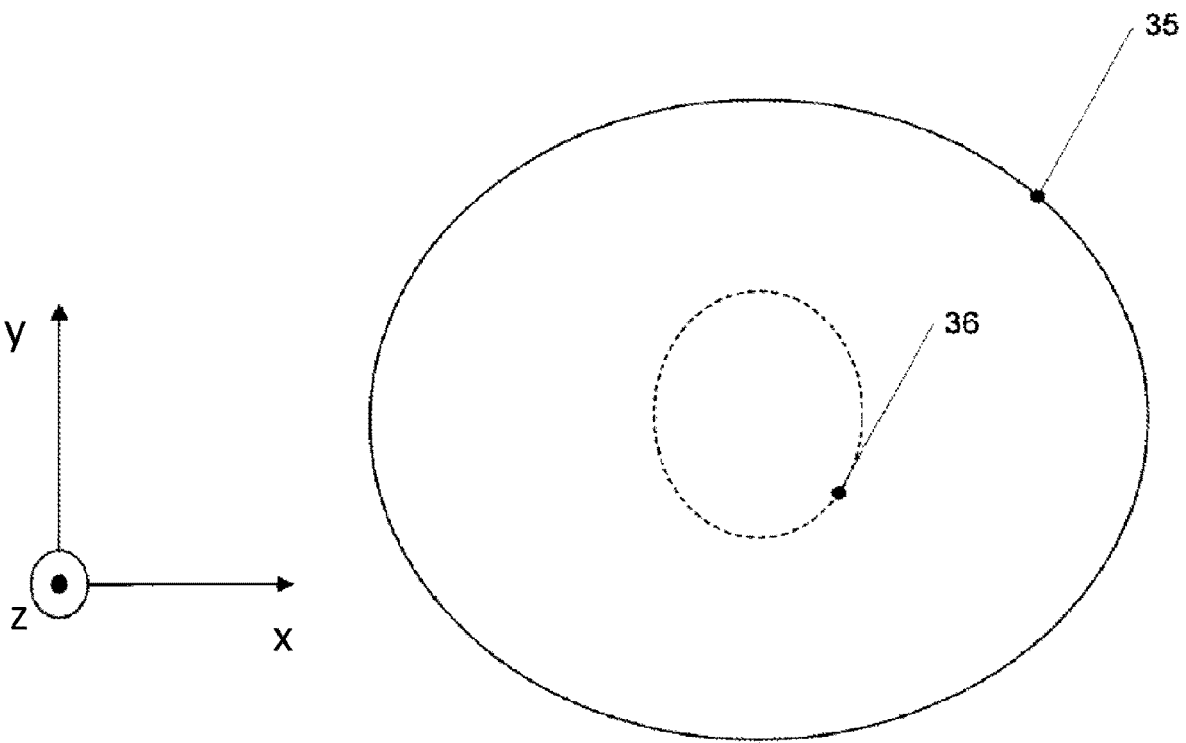
FIG. 10 shows a diagram for elucidating the location of coordinate axes such as are used for describing the present disclosure.

Axis designations illustrated in FIG. 10 are used for the further explanations below. FIG. 10 shows a plan view of the spectacle lens 35 and the holder 36 along the optical axis 310. The z-axis runs parallel to the optical axis 310 in FIG. 3, and the x- and y-axis are perpendicular thereto, substantially in a lens plane which approximately describes a plane of the spectacle lens when the spectacle lens lies on the holder 36 without tilting. An offset of the spectacle lens 35 in the xy-plane is evident from the fact that the apparent location of the permanent marks is displaced. A tilting about the x- or y-axes principally displaces the location of the reflection points, while the apparent location of the permanent marks changes comparatively little. In addition, the location of the permanent marks is also dependent on the rotation about the z-axis. Thus, overall, it is possible to determine the offset along the x- and y-axes, tiltings about the x- and y-axes and the rotation about the z-axis by evaluating the location of the reflections (314) that is detected by the camera 31 and also the apparent location of the permanent marks. This evaluation can be carried out with the computing unit 39 by way of a corresponding computer program. Significant factors in the calculation are the locations of the external light sources 30A . . . 30F, the optical data of the image recording unit 30, the known data of the spectacle lens (represented in its own coordinate system associated with the spectacle lens, the location, and orientation of which with respect to the world coordinate system of the image recording unit are unknown and they are intended to be determined according to the disclosure). Significant factors are, in particular, the location of the permanent marks and, in the case of marks on the back side of the spectacle lens, also the refractive index of the spectacle lens. Once the position and orientation of the spectacle lens 35 have been determined, a stamping can be applied on the spectacle lens by means of a stamping device 38. In this case, the stamping device 38 is configured as an inkjet print head in the example illustrated.

In the case of stamping using an inkjet printing method (inkjet method) by means of the stamping device 38, the tilting is less important in this case since the print head hovers above the spectacle lens during printing. For the accurate determination of the offset (location in the x- and y-directions), in the case of lenses in which the permanent marks lie on the back side of the spectacle lens (facing the suction holder 36), this absolutely matters since, if the spectacle lens is tilted differently, the apparent location of the permanent marks changes, as has been explained with reference to FIG. 7. This effect is particularly pronounced for spectacle lenses having a high negative optical power, that is to say for lenses having –10 dpt sphere or cylinder, for example, because there the path of the light ray in the spectacle lens is relatively long, which results in a greater change in location depending on the tilting.

Figure 8:
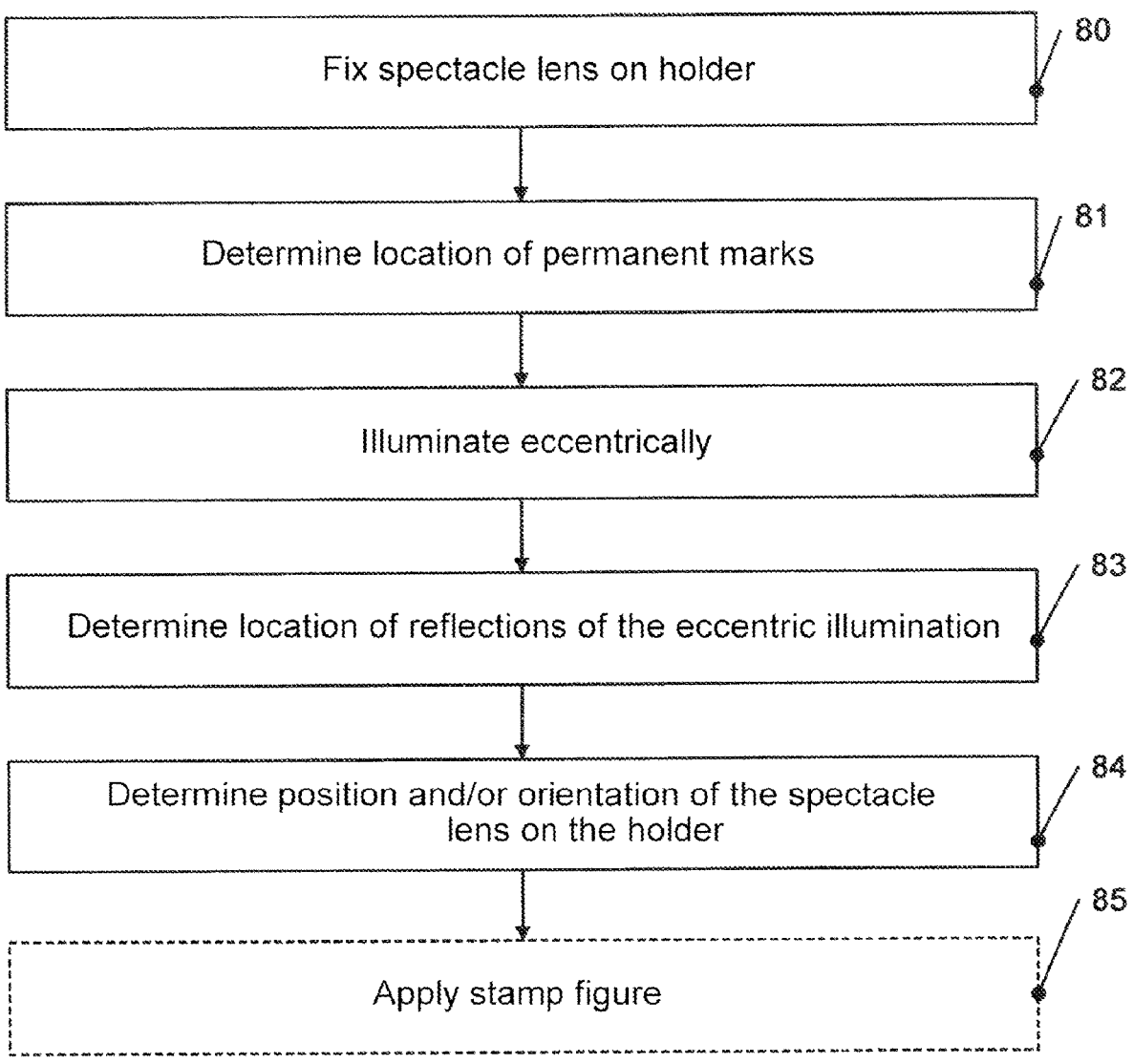
FIGS. 8 and 9 show flow diagrams of methods in accordance with exemplary embodiments of the disclosure.
Figure 9:
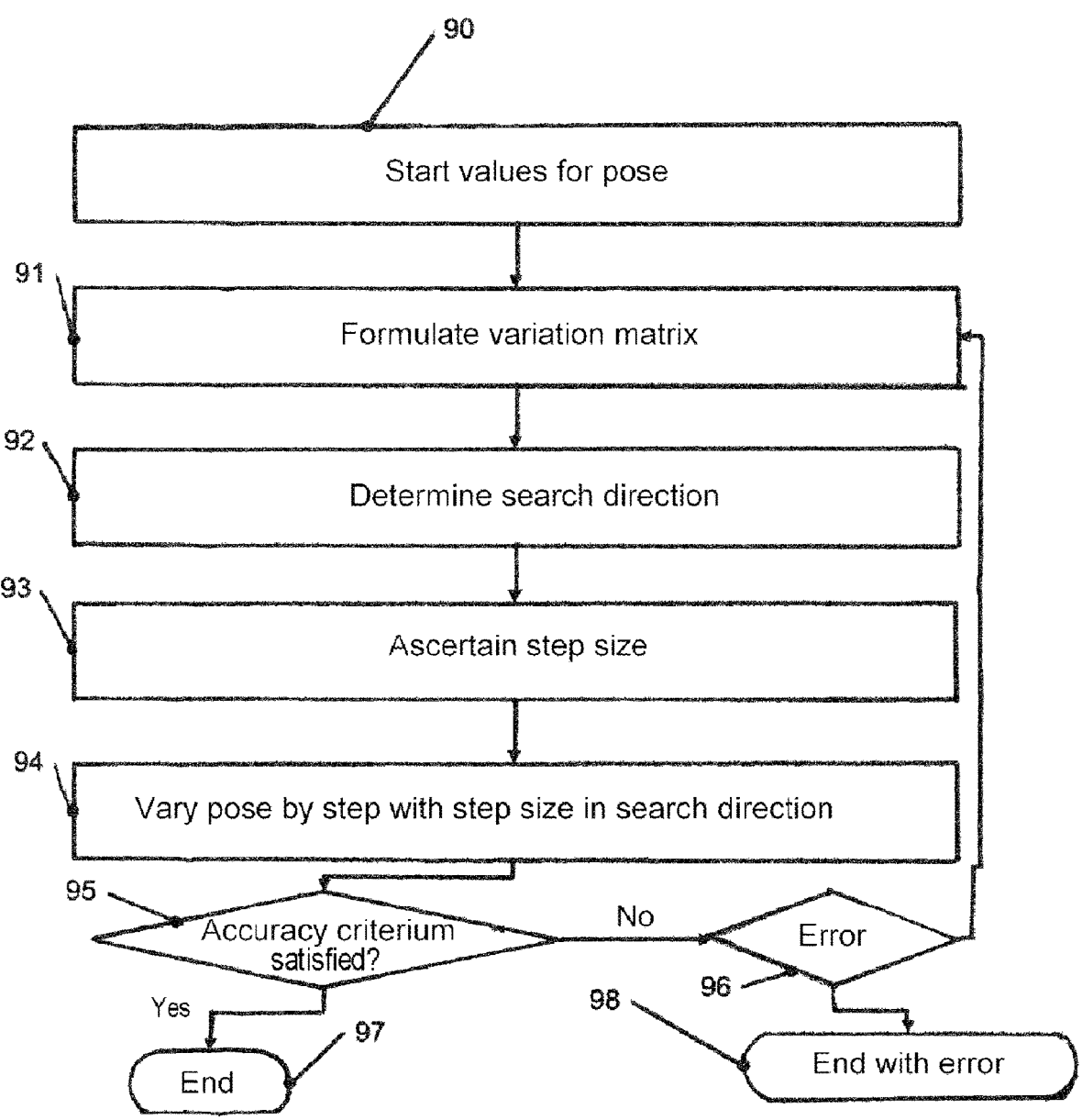

The determination of the position and/or orientation of the spectacle lens 35 on the suction holder 36 will now be explained in greater detail with reference to FIGS. 8 and 9. FIGS. 8 and 9 show flow diagrams of methods which can be carried out in the device from FIG. 3 under the control of the computing unit 39. In this case, the method in FIG. 8 illustrates the general method sequence, while FIG. 9 shows an iterative method for determining the parameters explained above with reference to FIG. 10 (offset in the x- and y-directions, tilting about the x- and y-axes, and rotation about the z-axis).

In step 80, the spectacle lens 35 is fixed on the holder 36. In step 81, the apparent location of permanent marks is determined, wherein, for this purpose, as explained, the light source 33 provides a coaxial reflected-light illumination. In step 82, the spectacle lens 36 is eccentrically illuminated by one or more of the light sources 34A to 34C, e.g., successively or in groups, such that it is possible to decide unambiguously which reflection originates from which light source. Reflections for which it is not possible to decide whether they come from the front side or the back side are disregarded if there is more than one external light source whose reflections are visible. In step 83, the location of reflections that were caused by the eccentric illumination is determined by the image or images recorded by the camera 31 being correspondingly evaluated. A reflection can be identified from the fact that it is a spatially small and bright phenomenon. There are many possibilities for evaluating such a reflection if it is incident on more than one camera pixel: that could then be done by establishing, e.g., the centroid of all pixels in the vicinity which exceed a threshold value, or a best fit of an intensity distribution such as is expected for light sources which lie at the virtual distance of the virtual location of the light source after reflection at a correspondingly curved mirror, etc.

Step 84 then involves calculating the position and/or orientation of the spectacle lens 35 on the holder 36, e.g., iteratively as described below with reference to FIG. 9. On the basis of these results, in step 85, for example, a stamp figure can then be applied on the spectacle lens by the stamping device 38. Since the spectacle lens is not held in the correct orientation in most cases, a rotated stamp figure displaced by the decentration of the lens on the holder is printed. If necessary, consideration is also given to the distortions of the inkjet figure owing to the different flight times of the inkjet droplets, which result from the fact that the different points of the stamp figure to be printed are at different distances from the lens front surface.

FIG. 9 shows an iterative method for determining location and orientation, which is one example of the implementation of step 84 from FIG. 8.

The method in FIG. 9 uses a submethod (not explicitly illustrated in FIG. 9), which is used repeatedly in the course of the method in FIG. 9. The submethod is referred to below for short as SR and can be implemented as a corresponding subroutine in the computing unit 39. For a spectacle lens pose ascertained in the course of the method in FIG. 9, the submethod calculates the expected apparent location of the permanent marks and expected locations of the reflections caused by the eccentric illumination (separated according to reflections from the front and back sides of the spectacle lens). SR thus effects ray traces. As evident from FIGS. 7A to 7F, these are based on simple geometric optics. SR furthermore compares the calculated expected apparent location of the permanent marks and the expected location of the reflections with the corresponding locations detected in steps 81 and 83. As a result, the SR returns an error vector identifying the deviations that result in the course of this comparison. In the method in FIG. 9, current pose denotes that pose which corresponds to an instantaneous status of the iterative calculation in FIG. 9.

The method in FIG. 9 begins in step 90 with an initialization that sets start values for the current pose of the spectacle lens: the start values for decentration (offset in the xy-plane) and rotation about the z-axis can be established for example in accordance with the detection of the apparent locations of the permanent marks from step 81: in this case, the decentration is determined from the center of the identified permanent marks projected into the xy-plane of an ideally positioned spectacle lens, compared with the location of the axis of the holder in the xy-plane. The rotation about the z-axis of the world coordinate system is determined from the direction from the left to the right permanent mark in the aforementioned plane. The tilting is assumed, for example, to be tilting such as results from the holder characteristic at this holding point, or it is set to 0 as the start value.

In step 91, all parameters (decentration, rotation, tilting) of the current pose are varied by small values and SR calculates what influence that has on the error vector. The result is the variation matrix. The latter indicates how the error vector changes depending on the small variations of the parameters.

In step 92, the pseudoinverse (see e.g., German Wikipedia article "Pseudoinverse [pseudoinverse]," as of Jul. 16, 2017) of the variation matrix is calculated; together with the error vector from step 91 that yields the search direction, i.e., a direction in which the parameters are changed in the next step.

In step 93, the minimum of the (weighted) sum of the squares of the elements of the error vector is ascertained for various step sizes w when the current parameters of the current pose are varied by w* search direction relative to the status directly before step 91. Ideally, the minimum is at w=1, but a different result can also arise for w. In the present exemplary embodiment, w is determined by using the Brent method and within that SR repeatedly. (See e.g., Press et al., Numerical Recipes, Second Edition (1992), pages 394ff.)

In step 94, the current pose is updated to that for the minimum just found, i.e., the pose is varied by w* search direction for the w which yielded the minimum.

Step 95 involves checking an accuracy criterium as to whether the, e.g., weighted sum of the squares of the deviations indicated by the error vector has fallen below a predefined threshold. The accuracy criterium generally indicates how well the current pose matches the measured variables. If the accuracy criterium is satisfied (e.g., the weighted sum of squares is below the threshold or is even zero), the method is ended in step 97 and the last current pose is deemed to be determined accurately enough. The last current pose then represents the result of the method in FIG. 9.

If the check from step 95 reveals that the accuracy criterium has not yet been reached, diverse error criterium are checked as well in step 96: this involves checking whether the passes of the method have still resulted in improvements in the pose (reduction of the error criterium) or whether step 91 has already been carried out more often than a predefined maximum number. Moreover, in the other method steps and also in the SR there may also be error conditions that must be picked up by the method, e.g., poses which cannot occur at all.

If appropriate, the method is terminated with an error message in step 98. Otherwise, the method jumps back to step 91 for a renewed pass.

If the device has more than one camera, each image by itself is evaluated and the apparent locations of the permanent marks and of the additional reflection points are identified therein. All these optical configurations are then evaluated jointly in a minimum search as described above, thus yielding the location and orientation of the spectacle lens in the device (apart from measurement and truncation errors that always occur in such approximative methods).

Using the data determined in this way, in step 85 the stamping is then applied at the correct position by means of the calculation of corresponding coordinates on the lens surface at which the stamping is to be applied. From the apparent locations of the permanent marks as explained with reference to FIG. 7, with addition of the reflections, the actual location can be determined.

At least some possible exemplary embodiments are specified in the clauses below:

Clause 1. A method for determining the position and/or orientation of a spectacle lens (35) having permanent marks and being held on a holder (36), comprising:

providing a detected apparent location of the permanent marks (P1, P2) on the spectacle lens (35),
characterized by
determining the position and/or orientation of the spectacle lens on the basis of the apparent location of the permanent marks and mark-independent additional information.

Clause 2. The method according to clause 1,
characterized by
detecting the apparent location of the permanent marks (P1, P2) on the spectacle lens (35) eccentrically illuminating the spectacle lens (35),
detecting a location of at least one reflection (312 to 315) caused by the eccentrically illuminating process on the spectacle lens,
wherein the mark-independent additional information comprises the apparent location of the at least one reflection.

Clause 3. The method according to clause 2, characterized in that detecting the apparent location of the at least one reflection comprises detecting repeatedly during a movement of the spectacle lens (35).

Clause 4. The method according to clause 2 or 3, characterized in that the eccentrically illuminating process comprises an eccentrically illuminating process using a plurality of light sources for generating a plurality of reflections.

Clause 5. The method according to clause 4, characterized in that the plurality of light sources are activated alternately individually or in groups.

Clause 6. The method according to any of clauses 2-5, characterized in that detecting the location of the permanent marks is carried out with a first light wavelength and detecting the location of the at least one reflection is carried out by means of illumination with a second light wavelength, wherein the spectacle lens (35) has a higher absorption for the second light wavelength than for the first light wavelength.

Clause 7. The method according to any of clauses 1-6, characterized in that detecting the apparent location of permanent marks and/or detecting the location of the at least one reflection are/is carried out from a plurality of observation directions.

Clause 8. The method according to any of clauses 1-7, characterized in that the mark-independent additional information comprises calculated or experimentally ascertained location properties of different shapes of spectacle lenses on the holder (36).

Clause 9. The method according to any of clauses 1-8, characterized in that determining the position and/or orientation of the spectacle lens (35) comprises an iterative calculation of the position and/or orientation of the spectacle lens (35).

Clause 10. A computer program comprising a program code which, when executed on a processor, causes the method according to any of clauses 1-9 to be carried out.

Clause 11. A device for determining the position and/or orientation of a spectacle lens having permanent marks and being held on a holder, comprising:

a providing unit for providing a detected apparent location of the permanent marks on the spectacle lens (35),
characterized by
a computing unit (39) for determining the position and/or orientation of the spectacle lens on the basis of the apparent location of the permanent marks and mark-independent additional information.

Clause 12. The device according to clause 11, characterized by a detection unit for detecting the apparent location of the permanent marks on the spectacle lens (35).

Clause 13. The device according to clause 12,
characterized by
an illumination unit (34A-34C) for eccentrically illuminating the spectacle lens,
wherein the detection unit (31) is further configured to detect a location of at least one reflection caused by a process of eccentrically illuminating by the illumination unit, wherein the mark-independent additional information comprises the location of the at least one reflection.

Clause 14. The device according to clause 13, characterized in that the illumination unit (34A-34C) comprises a multiplicity of light sources arranged eccentrically with respect to an optical axis of the detection unit, wherein the computing unit (39) is typically configured to activate the light sources alternatively.

Clause 15. The device according to any of clauses 11-14, characterized in that the mark-independent additional information comprises calculated or experimentally ascertained location properties of different shapes of spectacle lenses on the holder (36).

Clause 16. The method according to any of clauses 1-9, characterized in that the mark-independent additional information comprises calculated or experimentally ascertained location properties of different shapes of spectacle lenses on the holder (36).

Clause 17. The method according to clause 16, characterized in that the mark-independent additional information comprises calculated or experimentally ascertained location properties of different shapes of spectacle lenses on the holder (36).

Clause 18. The method according to any of clauses 16-17, characterized in that the mark-independent additional information comprises calculated or experimentally ascertained location properties of different shapes of spectacle lenses on the holder (36).

Clause 19. The method according to any of clauses 16-18, characterized in that the mark-independent additional information comprises calculated or experimentally ascertained location properties of different shapes of spectacle lenses on the holder (36).

Clause 20. The method according to any of clauses 16-19, characterized in that the mark-independent additional information comprises calculated or experimentally ascertained location properties of different shapes of spectacle lenses on the holder (36).

Clause 21. The method according to any of clauses 16-20, characterized in that the mark-independent additional information comprises calculated or experimentally ascertained location properties of different shapes of spectacle lenses on the holder (36).

Clause 22. A method for determining the position and/or orientation of a spectacle lens (35) having permanent marks and being held on a holder (36), comprising:

providing a detected apparent location of the permanent marks on the spectacle lens (35), wherein the apparent location of the permanent marks differs from a real location of the permanent marks on account of light refraction by the spectacle lens, determining the position and/or orientation of the spectacle lens on the basis of the apparent location of the permanent marks and mark-independent additional information, characterized in that the mark-independent additional information comprises calculated or experimentally ascertained location properties of different shapes of spectacle lenses on the holder (36), wherein the location properties comprise holding characteristics of the holder.

Clause 23. The method according to clause 22, characterized by detecting the apparent location of the permanent marks on the spectacle lens (35), eccentrically illuminating the spectacle lens (35), detecting a location of at least one reflection (312 to 315) caused by the eccentrically illuminating process on the spectacle lens, wherein the mark-independent additional information comprises the apparent location of the at least one reflection.

Clause 24. The method according to clause 23, characterized in that detecting the apparent location of the at least one reflection comprises detecting repeatedly during a movement of the spectacle lens (35).

Clause 25. The method according to any of clauses 23 or 24, characterized in that the eccentrically illuminating process comprises an eccentrically illuminating process using a plurality of light sources for generating a plurality of reflections.

Clause 26. The method according to clause 25, characterized in that the plurality of light sources are activated alternately individually or in groups.

Clause 27. The method according to any of clauses 23-26, characterized in that detecting the location of the permanent marks is carried out with a first light wavelength and detecting the location of the at least one reflection is carried out by means of illumination with a second light wavelength, wherein the spectacle lens (35) has a higher absorption for the second light wavelength than for the first light wavelength.

Clause 28. The method according to any of clauses 23-27, characterized in that detecting the apparent location of permanent marks and/or detecting the location of the at least one reflection are/is carried out from a plurality of observation directions.

Clause 29. The method according to any of clauses 23-28, characterized in that the mark-independent additional information comprises calculated or experimentally ascertained location properties of different shapes of spectacle lenses on the holder (36).

Clause 30. The method according to any of clauses 23-29, characterized in that determining the position and/or orientation of the spectacle lens (35) comprises an iterative calculation of the position and/or orientation of the spectacle lens (35).

Clause 31. A computer program comprising a program code which, when executed on a processor, causes the method according to any of clauses 23-30 to be carried out.

Clause 32. The device according to any of clauses 1-15, characterized in that the mark-independent additional information comprises calculated or experimentally ascertained location properties of different shapes of spectacle lenses on the holder (36).

Clause 33. The device according to clause 32, characterized in that the mark-independent additional information comprises calculated or experimentally ascertained location properties of different shapes of spectacle lenses on the holder (36).

Clause 34. The device according to any of clauses 32 or 33, characterized in that the mark-independent additional information comprises calculated or experimentally ascertained location properties of different shapes of spectacle lenses on the holder (36).

Clause 35. The device according to any of clauses 32-34, characterized in that the mark-independent additional information comprises calculated or experimentally ascertained location properties of different shapes of spectacle lenses on the holder (36).

Clause 36. The device according to any of clauses 32-35, characterized in that the mark-independent additional information comprises calculated or experimentally ascertained location properties of different shapes of spectacle lenses on the holder (36).

Clause 37. The device according to any of clauses 32-36, characterized in that the mark-independent additional information comprises calculated or experimentally ascertained location properties of different shapes of spectacle lenses on the holder (36).

Clause 38. A device for determining the position and/or orientation of a spectacle lens having permanent marks and being held on a holder, comprising:

a providing unit for providing a detected apparent location of the permanent marks on the spectacle lens (35), wherein the apparent location of the permanent marks differs from a real location of the permanent marks on account of light refraction by the spectacle lens, a computing unit (39) for determining the position and/or orientation of the spectacle lens on the basis of the apparent location of the permanent marks and mark-independent additional information, characterized in that the mark-independent additional information comprises calculated or experimentally ascertained location properties of different shapes of spectacle lenses on the holder (36), wherein the location properties comprise holding characteristics of the holder.

Clause 39. The device according to clause 38, characterized by a detection unit for detecting the apparent location of the permanent marks on the spectacle lens (35).

Clause 40. The device according to clause 39, characterized by an illumination unit (34A-34C) for eccentrically illuminating the spectacle lens, wherein the detection unit (31) is further configured to detect a location of at least one reflection caused by a process of eccentrically illuminating by the illumination unit, wherein the mark-independent additional information comprises the location of the at least one reflection.

Clause 41. The device according to clause 40, characterized in that the illumination unit (34A-34C) comprises a multiplicity of light sources arranged eccentrically with respect to an optical axis of the detection unit, wherein the computing unit (39) is typically configured to activate the light sources alternatively.

Clause 96. The device according to any of clauses 40 or 41, characterized in that the mark-independent additional information comprises calculated or experimentally ascertained location properties of different shapes of spectacle lenses on the holder (36).

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for determining at least one of a position or an orientation of a spectacle lens mounted on a holder, the spectacle lens having a permanent mark, the method comprising:

detecting an apparent location of the permanent mark on the spectacle lens, the apparent location of the permanent mark being different from a real location of the permanent mark on account of light refraction by the spectacle lens;

eccentrically illuminating the spectacle lens with an eccentric light source;

detecting a location of at least one reflection of the eccentric light source on the spectacle lens within a region of the spectacle lens, the region of the spectacle lens being smaller than an entire surface of the spectacle lens; and determining at least one of the position or the orientation of the spectacle lens relative to the holder on a basis of the apparent location of the permanent mark and mark-independent additional information, the mark-independent additional information including the location of the at least one reflection determined in the region of the spectacle lens, wherein the real location of the permanent mark and the location of the at least one reflection are on opposite sides of the spectacle lens.

2. The method as claimed in claim 1, wherein the holder is composed of an opaque material.

3. The method as claimed in claim 1, wherein the holder is a suction holder.

4. The method as claimed in claim 1, wherein detecting the apparent location of the at least one reflection comprises:

repeatedly detecting the apparent location of the at least one reflection during a movement of the spectacle lens.

5. The method as claimed in claim 1, wherein eccentrically illuminating comprises:

eccentrically illuminating the spectacle lens with a plurality of eccentric light sources; and generating a plurality of reflections.

6. The method as claimed in claim 5, further comprising:

alternately activating a respective eccentric light source or a group of eccentric light sources from the plurality of light sources.

7. The method as claimed in claim 1, further comprising:

detecting the apparent location of the permanent mark with light of a first wavelength; and detecting the location of the at least one reflection with light of a second wavelength, wherein the spectacle lens has a higher absorption for the light of the second wavelength than for the light of the first wavelength.

8. The method as claimed in claim 1, further comprising:

detecting at least one of the apparent location of the permanent mark or the location of the at least one reflection from a plurality of observation directions.

9. The method as claimed in claim 1, wherein determining the at least one of the position or the orientation of the spectacle lens further comprises:

performing an iterative calculation.

10. A computer program stored on a non-transitory storage medium and having a program code which, when executed on a processor, causes the method as claimed in claim 1 to be carried out.

11. The method as claimed in claim 1, wherein determining the at least one of the position or the orientation of the spectacle lens further comprises:

performing an iterative calculation.

12. A computer program stored on a non-transitory storage medium and having a program code which, when executed on a processor, causes the method as claimed in claim 1 to be carried out.

13. A method for determining at least one of a position or an orientation of a spectacle lens mounted on a holder, the spectacle lens having a permanent mark, the method comprising:

mounting the spectacle lens on the holder, wherein the at least one of the position or the orientation of the spectacle lens relative to the holder is unknown;

detecting an apparent location of the permanent mark on the spectacle lens from a plurality of observation directions, the apparent location of the permanent mark being different from a real location of the permanent mark on the spectacle lens on account of light refraction by the spectacle lens;

illuminating the spectacle lens with an eccentric light source;

detecting a location of at least one reflection of the eccentric light source on the spectacle lens; and determining the at least one of the position or the orientation of the spectacle lens in the unknown position and/or orientation relative to the holder on a basis of the apparent location of the permanent mark determined from the plurality of observation directions and mark-independent additional information, wherein the real location of the permanent mark and the location of the at least one reflection are on opposite sides of the spectacle lens.

14. The method as claimed in claim 13, wherein the mark-independent additional information comprises the location of the at least one reflection.

15. The method as claimed in claim 14, wherein detecting the apparent location of the at least one reflection comprises:

repeatedly detecting the apparent location of the at least one reflection during a movement of the spectacle lens.

16. The method as claimed in claim 14, wherein eccentrically illuminating comprises:

eccentrically illuminating the spectacle lens with a plurality of eccentric light sources; and generating a plurality of reflections.

17. The method as claimed in claim 16, further comprising:

alternately activating a respective eccentric light source or a group of eccentric light sources from the plurality of light sources.

18. The method as claimed in claim 14, further comprising:

detecting the apparent location of the permanent mark with light of a first wavelength; and detecting the location of the at least one reflection with light of a second wavelength, wherein the spectacle lens has a higher absorption for the light of the second wavelength than for the light of the first wavelength.

19. The method as claimed in claim 14, wherein determining the at least one of the position or the orientation of the spectacle lens further comprises:

performing an iterative calculation.

20. A computer program stored on a non-transitory storage medium and having a program code which, when executed on a processor, causes the method as claimed in claim 19 to be carried out.

21. A device for determining at least one of a position or an orientation of a spectacle lens mounted on a holder, the spectacle lens having a permanent mark, the device comprising:

a providing unit configured to provide a detected apparent location of the permanent mark on the spectacle lens;

a computing unit configured to determine the at least one of the position or the orientation of the spectacle lens on a basis of the apparent location of the permanent mark and mark-independent additional information, the apparent location of the permanent mark being different from a real location of the permanent mark on account of light refraction by the spectacle lens;

at least one light source being arranged eccentrically with respect to an optical axis of a camera to eccentrically illuminate the spectacle lens; and the camera having the optical axis and being configured to detect the apparent location of the permanent mark on the spectacle lens and to detect a location of at least one reflection of the at least one light source on the spectacle lens, wherein the mark-independent additional information includes the location of the at least one reflection, wherein the real location of the permanent mark and the location of the at least one reflection are on opposite sides of the spectacle lens, and wherein determining the at least one of the position or the orientation of the spectacle lens includes detecting the location of the at least one reflection of the at least one light source on the spectacle lens within a region of the spectacle lens, the region of the spectacle lens being smaller than an entire surface of the spectacle lens.

22. The device as claimed in claim 21, further comprising:

the holder configured to releasably secure the spectacle lens by suction, wherein the holder at least partly includes an opaque material.

23. The device as claimed in claim 21, further comprising:

at least two light sources arranged eccentrically with respect to the optical axis of the camera, wherein the computing unit is configured to activate the at least two light sources alternatively.

24. The device as claimed in claim 21, wherein the camera is further configured to detect the location of the permanent mark with light of a first wavelength and to detect the location of the at least one reflection with light of a second wavelength, wherein the spectacle lens has a higher absorption for the light of the second wavelength than for the light of the first wavelength.

25. The device as claimed in claim 24, further comprising:

at least two light sources arranged eccentrically with respect to the optical axis of the camera, wherein the computing unit is configured to activate the at least two light sources alternatively.

26. A device for determining at least one of a position or an orientation of a spectacle lens mounted on a holder, the spectacle lens having a permanent mark, the device comprising:

a providing unit configured to provide the detected apparent location of the permanent mark on the spectacle lens from a camera having an optical axis, the apparent location of the permanent mark being different from a real location of the permanent mark on account of light refraction by the spectacle lens;

at least one light source being arranged eccentrically with respect to the optical axis of the camera to eccentrically illuminate the spectacle lens, a computing unit configured to determine the at least one of the position or the orientation of the spectacle lens on a basis of the apparent location of the permanent mark and mark-independent additional information, wherein the camera having the optical axis is configured to detect the apparent location of the permanent mark from a plurality of observation directions, wherein the camera is further configured to detect a location of at least one reflection of the at least one light source on the spectacle lens, wherein the real location of the permanent mark and the location of the at least one reflection are on opposite sides of the spectacle lens, wherein the location of the at least one reflection is on the side of the spectacle lens facing the camera, and wherein the at least one of the position or the orientation of the spectacle lens relative to the holder is unknown during the detecting of the apparent location of the permanent mark on the spectacle lens from the plurality of observation directions and the detecting the location of the at least one reflection of the at least one light source on the spectacle lens.

27. The device as claimed in claim 26, further comprising: the camera having the optical axis for detecting the apparent location of the permanent mark on the spectacle lens.

28. The device as claimed in claim 27, wherein the mark-independent additional information comprises the location of the at least one reflection.

29. The device as claimed in claim 28, further comprising: at least two light sources arranged eccentrically with respect to the optical axis of the camera, wherein the computing unit is configured to activate the at least two light sources alternatively.

30. The device as claimed in claim 24, wherein the camera is configured to detect the location of the at least one reflection from a plurality of observation directions.

31. The device as claimed in claim 30, further comprising: at least two light sources arranged eccentrically with respect to the optical axis of the camera, wherein the computing unit is configured to activate the at least two light sources alternatively.

32. A device for determining at least one of a position or an orientation of a spectacle lens mounted on a holder, the spectacle lens having a permanent mark, the device comprising:

a providing unit configured to provide a detected apparent location of the permanent mark on the spectacle lens, the detected apparent location of the permanent mark being different from a real location of the permanent mark on account of light refraction by the spectacle lens;

a computing unit configured to determine the at least one of the position or the orientation of the spectacle lens on a basis of the apparent location of the permanent mark and mark-independent additional information, wherein the computing unit is configured to determine the at least one of the position or the orientation of the spectacle lens on a basis of an iterative calculation of the at least one of the position or the orientation, wherein the computing unit is configured to carry out the iterative calculation on a basis of a holding characteristic and the detected apparent location of the permanent mark, wherein the holding characteristic is determined in advance, wherein the holding characteristic determined in advance is stored in a memory or retrievable from a server via a communication network, and wherein determining the at least one of the position or the orientation of the spectacle lens includes determining whether the spectacle lens is at least one of tilted, rotated, or decentered relative to the holder; and a stamping device configured to provide a stamping figure on the side opposite of the permanent marking of the spectacle lens in the detected position and/or orientation based on the detected apparent location of the permanent marking.

33. A device for determining at least one of a position or an orientation of a spectacle lens mounted on a holder, the spectacle lens having a permanent mark, the device comprising:

a providing unit configured to provide a detected apparent location of the permanent mark on the spectacle lens, the apparent location of the permanent mark being different from a real location of the permanent mark on account of light refraction by the spectacle lens;

a computing unit configured to determine the at least one of the position or the orientation of the spectacle lens on a basis of the apparent location of the permanent mark and mark-independent additional information; and a holder, wherein the holder is configured to releasably attach the spectacle lens, wherein the mark-independent additional information includes a characterization of the attachment of the lens on the holder, wherein a surface of the lens attached to the holder is approximated locally, and wherein determining the at least one of the position or the orientation of the spectacle lens includes determining whether the spectacle lens is at least one of tilted, rotated, or decentered relative to the holder; and a stamping device configured to provide a stamping figure on the side opposite of the permanent marking of the spectacle lens in the detected position and/or orientation based on the detected apparent location of the permanent marking.

* * * * *